(12) United States Patent
Gotou

(10) Patent No.: US 6,404,153 B2
(45) Date of Patent: Jun. 11, 2002

(54) MOTOR AND DISK DRIVE APPARATUS

(75) Inventor: Makoto Gotou, Nishinomiya (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/731,196

(22) Filed: Dec. 6, 2000

(30) Foreign Application Priority Data

Dec. 6, 1999 (JP) .......................................... 11-345807

(51) Int. Cl.⁷ ................................................ H02P 6/02
(52) U.S. Cl. ...................................... 318/254; 388/804
(58) Field of Search ................................ 318/254, 138, 318/431, 599; 388/254, 804

(56) References Cited

U.S. PATENT DOCUMENTS 4,879,498 A * 11/1989 Shinohara et al. .......... 318/254
5,577,152 A * 11/1996 Chen .......................... 388/804

FOREIGN PATENT DOCUMENTS

| JP | 57-27794 | 2/1982 |
|---|---|---|
| JP | 63-316688 | 12/1988 |
| JP | 5-184188 | 7/1993 |
| JP | 6-62593 | 3/1994 |
| JP | 6-237594 | 8/1994 |
| JP | 9-215376 | 8/1997 |
| JP | 10-271879 | 10/1998 |

* cited by examiner

Primary Examiner—Khanh Dang
(74) Attorney, Agent, or Firm—Akin, Gump, Strauss, Hauer & Feld, L.L.P.

(57) ABSTRACT

In a motor and a disk drive apparatus using the motor, a switching control part produces a PWM pulse signal in response to the comparison result between a current detected signal and a command signal. An activate control part determines the active periods of power transistors in response to the holding state of the state holding part, and performs high-frequency switching operation to turn ON/OFF the power transistors in response to the PWM pulse signal of the switching control part. Furthermore, a voltage detecting part stops the detection of terminal voltages for a predetermined time in response to the PWM operation by the switching control part. After the stop, the voltage detecting part resumes the detection of the terminal voltages. This prevents improper detection caused by PWM noise.

38 Claims, 25 Drawing Sheets

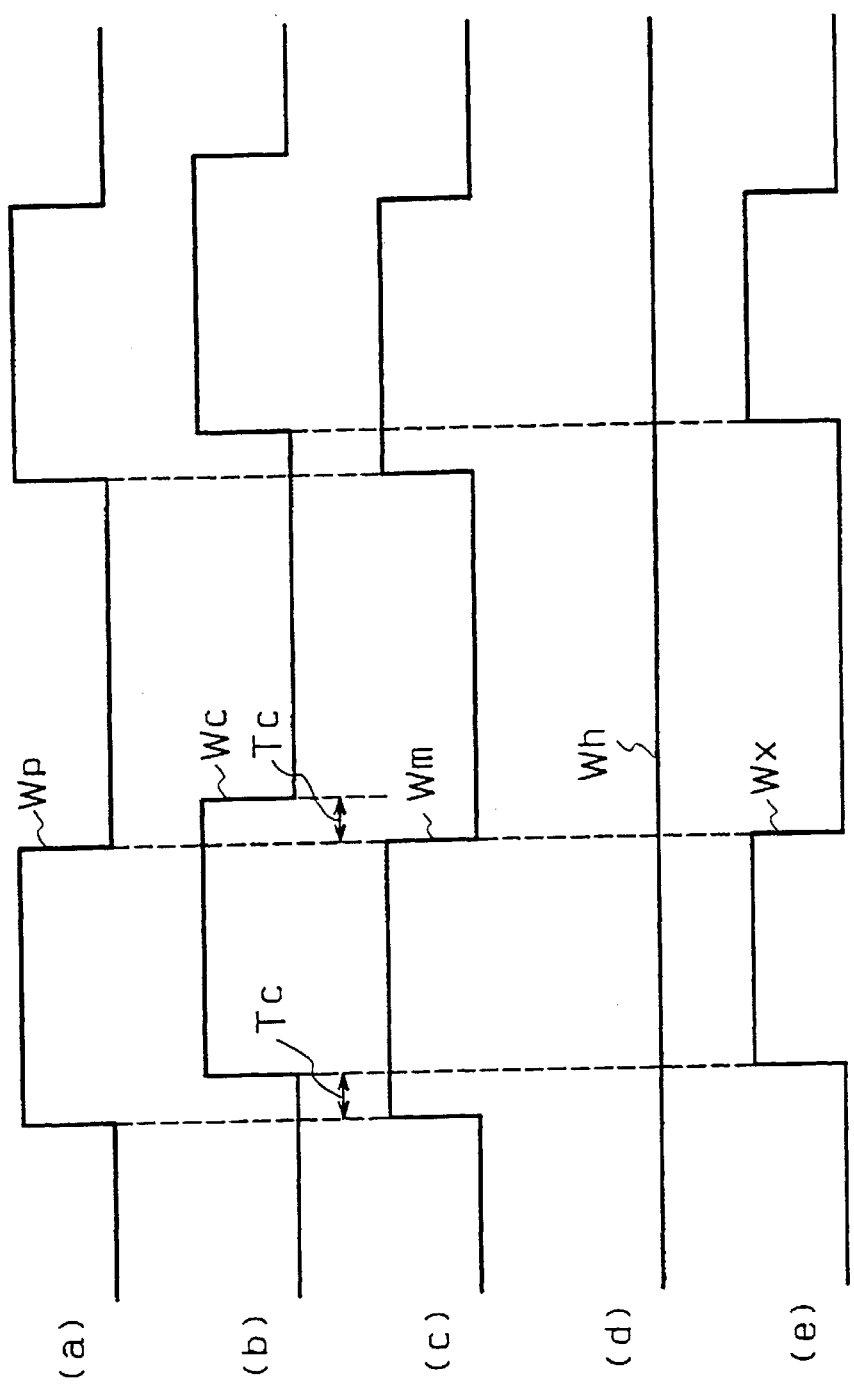

F I G. 2 0
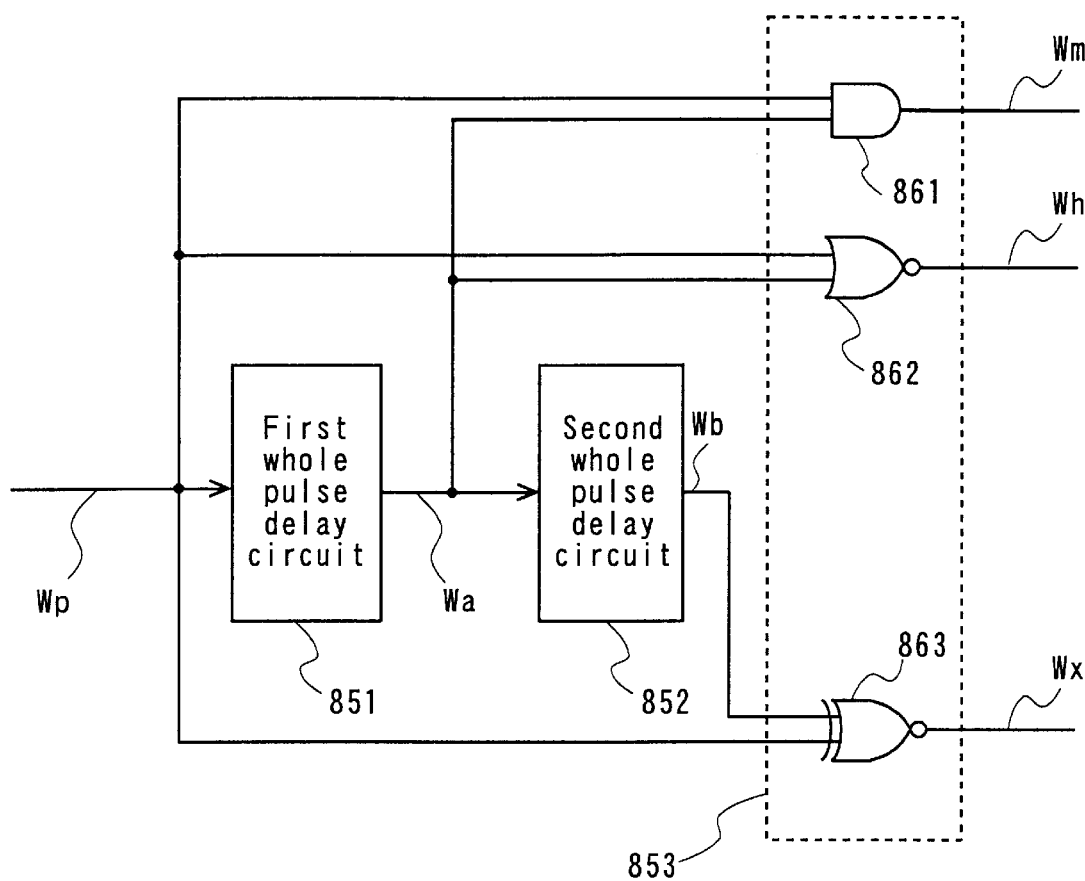

(a)

(b)

MOTOR AND DISK DRIVE APPARATUS

BACKGROUND OF THE INVENTION

The present invention relates to a motor and a disk drive apparatus including the motor.

In recent years, motors wherein current paths are alternated electronically with plural transistors have been used widely as drive motors for office automation apparatuses and audio-visual apparatuses. These motors are included in disk drive apparatuses, such as optical disk drive apparatuses (DVD apparatuses, CD apparatuses, etc.) and magnetic disk drive apparatuses (HDD apparatuses, FDD apparatuses, etc.). A motor wherein current paths to windings are alternated with PNP power transistors and NPN power transistors is available as an example of the above-mentioned motors.

FIG. 26 shows a conventional motor, and its operation will be described below. A rotor 2011 has a field part formed by a permanent magnet. Three position detecting elements of a position detector 2041 detect the magnetic field of the field part of the rotor 2011. In other words, the position detector 2041 generates two sets of voltage signals, Kp1, Kp2 and Kp3, and Kp4, Kp5 and Kp6, from the three-phase output signals of the three position detecting elements in response to the rotation of the rotor 2011. A first distributor 2042 generates three-phase low-side signals Mp1, Mp2 and Mp3 responding with the voltage signals Kp1, Kp2 and Kp3 respectively to control the activation of the low-side NPN power transistors 2021, 2022 and 2023 shown in FIG. 26. A second distributor 2043 generates three-phase high-side signals Mp4, Mp5 and Mp6 responding with the voltage signals Kp4, Kp5 and Kp6 respectively to control the activation of the high-side PNP power transistors 2025, 2026 and 2027 shown in FIG. 26. As a result, three-phase drive voltages are supplied to windings 2012, 2013 and 2014.

In the conventional configuration, power loses of the power transistors are large, and heat generation at the motor and the disk drive apparatus causes problems. The NPN power transistors 2021, 2022 and 2023 and the PNP power transistors 2025, 2026 and 2027 supply drive voltages having desired amplitudes to the windings 2012, 2013 and 2014 by controlling the voltage across the emitter and the collector in an analogue manner. Each of the NPN power transistors 2021, 2022 and 2023 and the PNP power transistors 2025, 2026 and 2027 changes the voltage across the emitter and the collector depending on the change in the resistance value across the emitter and the collector. Therefore, a remaining voltage in each power transistor is large, and a large power loss produced by the product of the large remaining voltage and the conducted current is generated, resulting in heat generation at each power transistor. Since a recordable disk (a RAM disk, a rewritable disk, etc.) is susceptible to heat, the heat generation at the power transistors, i.e., the main heat sources of the disk drive apparatus, is desired to be reduced as low as possible in order to improve the reliability of recording and/or-reproducing on/from the recordable disk.

In addition, since the position detector 2041 includes three position detecting elements for detecting the rotational position of the rotor 2011 so as to distribute drive currents to the windings, it is necessary to provide spaces for the position detecting elements. Furthermore, wire connection and the like for the elements become complicated, thereby raising the cost of the motor and the apparatus. By eliminating the position detecting elements, the motor can be made smaller, and the disk drive apparatus can be made thinner.

Furthermore, in the case of rewritable disk drive apparatuses, such as DVD-RAM/RW apparatuses, information is recorded and/or reproduced on/from a high-density disk. Therefore, it is desired to rotate the disk with reduced vibration during recording and/or reproducing on/from the disk. Moreover, it is necessary to rotate the disk at high speed with reduced acoustic noise in the case of reproducing from a DVD-ROM/CD-ROM disk. However, in a configuration without a position detecting element, it is very difficult to rotate the rotor and the disk with a low vibration and a low acoustic noise while reducing heat generation.

It has been strongly desired to develop a motor and/or a disk drive apparatus in which each of or all of these problems are solved. It is therefore an object of the present invention to solve the above-mentioned problems, respectively or concurrently and provide a motor and/or a disk drive apparatus that has the configuration suitable for reducing the power consumption and the acoustic noise.

BRIEF SUMMARY OF THE INVENTION

A motor in accordance with the present invention comprises:

a rotor which has a field part generating field fluxes;

Q-phase windings (Q is an integer of 3 or more);

voltage supplying means which includes two output terminals for supplying a DC voltage;

power supplying means having Q first power transistors and Q second power transistors for supplying a power to the Q-phase windings, each of the Q first power transistors forming a current path between one output terminal side of the voltage supplying means and one of the Q-phase windings, and each of the Q second power transistors forming a current path between the other output terminal side of the voltage supplying means and one of the Q-phase windings;

voltage detecting means for producing a detected pulse signal;

state shifting means for shifting a holding state from one state to at least one other state in sequence responding with the detected pulse signal of the voltage detecting means;

activation control means for controlling active periods of the Q first power transistors and the Q second power transistors responding with the holding state; and switching operation means for causing at least one of the Q first power transistors and the Q second power transistors to perform high-frequency switching corresponding to a command signal;

and that the activation control means produces Q-phase first activation control signals and Q-phase second activation control signals responding with said holding state of said state shifting means for controlling the active periods of the Q first power transistors and the Q second power transistors, each of the active periods being an electrical angle larger than 360/Q degrees, the switching operation means produces a switching pulse signal responding with the command signal, and makes high-frequency switching operation of at least one power transistor among the Q first power transistors and the Q second power transistors responding with the switching pulse signal, and the voltage detecting means stops detecting of the detected pulse signal during at least one of a first stop period including a changing timing from OFF to ON of the at least one power transistor and a second stop period including another changing timing from ON to OFF of the at least one power transistor, and executes detecting of the detected pulse signal during at least ON period of the at least one power transistor excluding the at least one of the first stop period and the second stop period, thereby producing the detected pulse signal responding with terminal voltages of the Q-phase windings. With this configuration, the switching operation means subjects the power transistors of the power supplying means to high-frequency switching. Therefore, power loses at the power transistors of the power supplying means can be reduced significantly, and heat generation at the motor can also be reduced greatly. In addition, the voltage detecting means produces the detected pulse signal responding with the terminal voltages of the windings, and the state shifting means shifts the phases of the activation to the windings in response to the detected pulse signal. Furthermore, the activation control means activates the power transistors responding with the holding state so as to rotate the rotor in a predetermined direction. Therefore, no position detecting element is required, and the configuration of the motor is simplified. Moreover, each of the active periods of the first power transistors and the second power transistors is made larger than an electrical angle of 360/Q degrees. Therefore, two power transistors among the first power transistors or the second power transistors are activated simultaneously in an alteration of current paths. The alteration of current paths is thus smoothened, and the generated drive force has less pulsation. As a result, the vibration and the acoustic noise of the motor can be reduced. In addition, the power transistor/transistors is/are subjected to high-frequency switching operation by using the switching pulse signal. The detection of the detected pulse signal is stopped at least one of the first stop period including the changing timing from OFF to ON of the power transistor and the second stop period including the other changing timing from ON to OFF of the power transistor. Therefore, it is possible to prevent improper detection owing to high-frequency noises in the terminal voltages caused by the high-frequency switching operation of the power transistor/transistors. In addition, the detection of the detected pulse signal in response to the result of the comparison of the winding terminal voltages is performed during at least the ON period of the power transistor excluding at least one of the above-mentioned stop periods. It is therefore possible to produce the detected pulse signal promptly responding with the comparison result of the terminal voltages. In other words, it is possible to obtain the detected pulse signal accurately responding with the terminal voltages. Therefore, the alteration of current paths to the windings can be performed at accurate timing in response to the detected pulse signal of the voltage detecting means, and the rotor can be rotated smoothly and accurately. Furthermore, in the case when speed control is performed in response to an output pulse signal such as the detected pulse signal of the voltage detecting means for example, the rotational speed of the rotor can be controlled accurately. In other words, it is possible to attain an accurate rotation of the motor without an influence of high-frequency switching noises in the terminal voltages. As a result, an excellent motor without a position detecting element can be realized, which reduces the power consumption, the motor vibration and the acoustic noise, according to the present invention.

A motor in accordance with another aspect of the present invention comprises:

a rotor which has a field part generating field fluxes;

Q-phase windings (Q is an integer of 3 or more);

voltage supplying means which includes two output terminals for supplying a DC voltage;

power supplying means having Q first power transistors and Q second power transistors for supplying a power to the Q-phase windings, each of the Q first power transistors forming a current path between one output terminal side of the voltage supplying means and one of the Q-phase windings, and each of the Q second power transistors forming a current path between the other output terminal side of the voltage supplying means and one of the Q-phase windings;

voltage detecting means for producing a detected pulse signal;

state shifting means for shifting a holding state from one state to at least one other state in sequence responding with the detected pulse signal of the voltage detecting means;

activation control means for controlling active periods of the Q first power transistors and the Q second power transistors responding with the holding state; and switching operation means for causing at least one of the Q first power transistors and the Q second power transistors to perform high-frequency switching corresponding to a command signal;

and that the activation control means produces Q-phase first activation control signals and Q-phase second activation control signals responding with said holding state of said state shifting means for controlling the active periods of the Q first power transistors and the Q second power transistors, each of the active periods being an electrical angle larger than 360/Q degrees, the switching operation means produces a switching pulse signal responding with the command signal, and makes high-frequency switching operation of at least one power transistor among the Q first power transistors and the Q second power transistors responding with the switching pulse signal, and the voltage detecting means includes:

voltage comparing means for producing an output signal responding with comparison result of terminal voltages of the Q-phase windings, and noise eliminating means for gating the output signal of the voltage comparing means with a noise eliminating signal responding or corresponding with the switching pulse signal, so as not to pass the output signal of the voltage comparing means during at least one of a first period including a changing timing from OFF to ON of the switching pulse signal and a second period including another changing timing from ON to OFF of the switching pulse signal.

With this configuration, the switching operation means subjects the power transistors of the power supplying means to high-frequency switching. Therefore, power loses at the power transistors of the power supplying means can be reduced significantly, and heat generation at the motor can also be reduced greatly. In addition, the voltage detecting means produces the detected pulse signal responding with the terminal voltages of the windings, and the state shifting means shifts the phases of the activation to the windings in response to the detected pulse signal. Furthermore, the activation control means activates the power transistors responding with the holding state so as to rotate the rotor in a predetermined direction. Therefore, no position detecting element is required, and the configuration of the motor is simplified. Moreover, each of the active periods of the first power transistors and the second power transistors is made larger than an electrical angle of 360/Q degrees. Therefore, two power transistors among the first power transistors or the second power transistors are activated simultaneously in an alteration of current paths. The alteration of current paths is thus smoothened, and the generated drive force has less pulsation. As a result, the vibration and the acoustic noise of the motor can be reduced. Furthermore, the voltage detecting means comprises the voltage comparing means and the noise eliminating means. In the noise eliminating means, the output signal of the voltage comparing means is logically gated with the noise eliminating signal which is responding with the switching pulse signal. In particular, the output signal of the voltage comparing means is nullified during at least one of the first period including the changing timing from OFF to ON of the switching pulse signal and the second period including the changing timing from ON to OFF of the switching pulse signal. Therefore, it is possible to produce the detected pulse signal free from an influence of noise due to the high-frequency switching operation of the power transistors. Furthermore, since the detected pulse signal responding with the output signal of the voltage comparing means is produced, it is possible to obtain the detected pulse signal promptly responding with the comparison result of the winding terminal voltages. Therefore, the alteration of current paths to the windings can be performed at accurate timing in response to the detected pulse signal of the voltage detecting means, and the rotor can be rotated smoothly and accurately. Furthermore, in the case when speed control is performed in response to an output pulse signal such as the detected pulse signal of the voltage detecting means for example, the rotational speed of the rotor can be controlled accurately. In other words, it is possible to attain an accurate rotation of the motor without an influence of high-frequency switching noises in the terminal voltages. As a result, an excellent motor without a position detecting element can be realized, which reduces the power consumption, the motor vibration and the acoustic noise, according to the present invention.

A motor in accordance with another aspect of the present invention comprises:

a rotor which has a field part generating field fluxes;

Q-phase windings (Q is an integer of 3 or more);

voltage supplying means which includes two output terminals for supplying a DC voltage;

power supplying means having Q first power transistors and Q second power transistors for supplying a power to said Q-phase windings, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal;

state shifting means for shifting a holding state from one state to at least one other state in sequence responding with the detected pulse signal of said voltage detecting means;

activation control means for controlling active periods of said Q first power transistors and said Q second power transistors responding with said holding state; and switching operation means for causing at least one of said Q first power transistors and said Q second power transistors to perform high-frequency switching corresponding to a command signal;

and that said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time, said activation control means produces Q-phase first activation control signals and Q-phase second activation control signals responding with said holding state of said state shifting means for controlling said active periods of said Q first power transistors and said Q second power transistors, each of said active periods being an electrical angle larger than 360/Q degrees, and said switching operation means includes:

current detecting means for producing a current detected signal responding with or corresponding to a current from said voltage supplying means to said Q-phase windings, and switching control means for comparing an output signal of said current detecting means with said command signal and producing a switching pulse signal responding with the comparison result, thereby making high-frequency switching operation of at least one power transistor among said Q first power transistors and said Q second power transistors responding with said switching pulse signal.

With this configuration, the switching operation means subjects the power transistors of the power supplying means to high-frequency switching. Therefore, power losses at the power transistors of the power supplying means can be reduced significantly, and heat generation at the motor can also be reduced greatly.

In addition, the voltage detecting means produces the detected pulse signal responding with the terminal voltages of the windings, and the state shifting means shifts the phases of the activation to the windings in response to the detected pulse signal.

Furthermore, the activation control means activates the power transistors responding with the holding state so as to rotate the rotor in a predetermined direction. Therefore, no position detecting element is required, and the configuration of the motor is simplified.

In addition, the state shifting means shifts the holding state from a first state to a second state after a first adjust time from detection of said detected pulse signal, and further shifts the holding state from the second state to a third state after a second adjust time (the second adjust time>the first adjust time) from detection of the detected pulse signal. The activation control means produces Q-phase first activation control signals and Q-phase second activation control signals responding with the holding state of the state shifting means for controlling the active periods of the Q first power transistors and the Q second power transistors. With this configuration, each of the active periods of the Q first power transistors and the Q second power transistors is made larger than an electrical angle of 360/Q degrees. Furthermore, the switching operation means controls the supply current to the Q-phase windings from the voltage supplying means in correspondence with the command signal by making high-frequency switching operation of at least one power transistor among the Q first power transistors and the Q second power transistors. With this configuration, two power transistors among the Q first power transistors or the Q second power transistors are activated simultaneously in each alteration of current paths while the at least one power transistor performs the high-frequency switching operation so as to control the supply current responding with the command signal.

Therefore, the supply current to the Q-phase windings is controlled responding with the command signal even when the two power transistors are activated simultaneously, and the pulsation of the generated drive force can be reduced. Furthermore, the alteration of current paths is thus smoothened by the simultaneous activation of the two power transistors, the pulsation of the generated drive force can further be reduced. As a result, an excellent motor without a position detecting element can be realized, which reduces the power consumption, the motor vibration and the acoustic noise, according to the present invention.

The switching operation means can be configured so as to include current detecting means for obtaining a current detected signal responding with the supply current to the Q-phase windings from the voltage supplying means, and switching control means for comparing the output signal of the current detecting means with the command signal and producing a switching pulse signal responding with the comparison result, thereby making high-frequency switching operation of at least one power transistor among the Q first power transistors and the Q second power transistors responding with the switching pulse signal. With this configuration, it is easy to control the supply current to the Q-phase windings responding with the command signal even when the two power transistors among the Q first power transistors or the Q second power transistors are activated simultaneously during an alteration of current paths.

The state shifting means can be configured so as to change the first adjust time and the second adjust time in response to an interval of the detected pulse signal. With this configuration, each of the active periods of the Q first power transistors and the Q second power transistors is easily made larger than 360/Q degrees (the period can be held at 130 degrees or more for example) even if the rotational speed of the rotor changes widely.

A disk drive apparatus in accordance with the present invention comprises:

a head for at least reproducing a signal from a disk or recording a signal on a disk;

processing means for at least processing an output signal from the head and outputting a reproducing information signal, or processing a recording information signal and outputting a signal into the head;

a rotor which has a field part generating field fluxes, and directly drives the disk;

Q-phase windings (Q is an integer of 3 or more);

voltage supplying means which include two output terminals for supplying a DC voltage;

power supplying means having Q first power transistors and Q second power transistors for supplying a power to the Q-phase windings, each of the Q first power transistors forming a current path between one output terminal side of the voltage supplying means and one of the Q-phase windings, and each of the Q second power transistors forming a current path between the other output terminal side of the voltage supplying means and one of the Q-phase windings;

voltage detecting means for producing a detected pulse signal;

state shifting means for shifting a holding state from one state to at least one other state in sequence responding with the detected pulse signal of the voltage detecting means;

activation control means for controlling active periods of the Q first power transistors and the Q second power transistors responding with the holding state; and switching operation means for causing at least one of the Q first power transistors and the Q second power transistors to perform high-frequency switching corresponding to a command signal;

and that the activation control means produces Q-phase first activation control signals and Q-phase second activation control signals responding with said holding state of said state shifting means for controlling the active periods of the Q first power transistors and the Q second power transistors, each of the active periods being an electrical angle larger than 360/Q degrees, the switching operation means produces a switching pulse signal responding with the command signal, and makes high-frequency switching operation of at least one power transistor among the Q first power transistors and the Q second power transistors responding with the switching pulse signal, and the voltage detecting means stops detecting of the detected pulse signal during at least one of a first stop period including a changing timing from OFF to ON of the at least one power transistor and a second stop period including another changing timing from ON to OFF of the at least one power transistor, and executes detecting of the detected pulse signal during at least ON period of the at least one power transistor excluding the at least one of the first stop period and the second stop period, thereby producing the detected pulse signal responding with terminal voltages of the Q-phase windings.

With this configuration, the switching operation means subjects the power transistors of the power supplying means to high-frequency switching. Therefore, power loses at the power transistors of the power supplying means can be reduced significantly, and heat generation at the disk drive apparatus can also be reduced greatly. In addition, the voltage detecting means produces the detected pulse signal responding with the terminal voltages of the windings, and the state shifting means shifts the phases of the activation to the windings in response to the detected pulse signal. Furthermore, the activation control means activates the power transistors responding with the holding state so as to rotate the disk in a predetermined direction. Therefore, no position detecting element is required, and the configuration of the disk drive apparatus is simplified. Furthermore, each of the active periods of the first power transistors and the second power transistors is made larger than an electrical angle of 360/Q degrees. Therefore, two power transistors among the first power transistors or the second power transistors are activated simultaneously in an the alteration of current paths. The alteration of current paths is thus smoothened, and the generated drive force has less pulsation. As a result, the disk drive apparatus has a low vibration and a low acoustic noise. In addition, the power transistor/ transistors is/are subjected to high-frequency switching operation by using the switching pulse signal. The detection of the detected pulse signal is stopped at least one of the first stop period including the changing timing from OFF to ON of the power transistor and the second stop period including the other changing timing from ON to OFF of the power transistor. Therefore, it is possible to prevent improper detection owing to high-frequency noises in the terminal voltages caused by the high-frequency switching operation of the power transistor/transistors. In addition, the detection of the detected pulse signal in response to the result of the comparison of the winding terminal voltages is performed during at least the ON period of the power transistor excluding at least one of the above-mentioned stop periods. It is therefore possible to produce the detected pulse signal promptly responding with the comparison result of the terminal voltages. In other words, it is possible to obtain a detected pulse signal accurately responding with the terminal voltages. Therefore, the alteration of current paths to the windings can be performed at accurate timing in response to the detected pulse signal of the voltage detecting means, and the disk can be rotated smoothly and accurately. Furthermore, in the case when speed control is performed in response to an output pulse signal such as the detected pulse signal of the voltage detecting means for example, the rotational speed of the disk can be controlled accurately. In other words, it is possible to attain an accurate rotation of the disk without an influence of high-frequency switching noises in the terminal voltages. As a result, an excellent disk drive apparatus can be realized, which reduces the power consumption, the disk vibration and the acoustic noise, according to the present invention.

A disk drive apparatus in accordance with another aspect of the present invention comprises:

a head for at least reproducing a signal from a disk or recording a signal on a disk;

processing means for at least processing an output signal from the head and outputting a reproducing information signal, or processing a recording information signal and outputting a signal into the head;

a rotor which has a field part generating field fluxes, and directly drives the disk;

Q-phase windings (Q is an integer of 3 or more);

voltage supplying means which includes two output terminals for supplying a DC voltage;

power supplying means having Q first power transistors and Q second power transistors for supplying a power to the Q-phase windings, each of the Q first power transistors forming a current path between one output terminal side of the voltage supplying means and one of the Q-phase windings, and each of the Q second power transistors forming a current path between the other output terminal side of the voltage supplying means and one of the Q-phase windings;

voltage detecting means for producing a detected pulse signal;

state shifting means for shifting a holding state from one state to at least one other state in sequence responding with the detected pulse signal of the voltage detecting means;

activation control means for controlling active periods of the Q first power transistors and the Q second power transistors responding with the holding state; and switching operation means for causing at least one of the Q first power transistors and the Q second power transistors to perform high-frequency switching corresponding to a command signal;

and that the activation control means produces Q-phase first activation control signals and Q-phase second activation control signals responding with said holding state of said state shifting means for controlling the active periods of the Q first power transistors and the Q second power transistors, each of the active periods being an electrical angle larger than 360/Q degrees, the switching operation means produces a switching pulse signal responding with the command signal, and makes high-frequency switching operation of at least one power transistor among the Q first power transistors and the Q second power transistors responding with the switching pulse signal, and the voltage detecting means includes:

voltage comparing means for producing an output signal responding with comparison result of terminal voltages of the Q-phase windings, and noise eliminating means for gating the output signal of the voltage comparing means with a noise eliminating signal responding or corresponding with the switching pulse signal, so as not to pass the output signal of the voltage comparing means during at least one of a first period including a changing timing from OFF to ON of the switching pulse signal and a second period including another changing timing from ON to OFF of the switching pulse signal.

With this configuration, the switching operation means subjects the power transistors of the power supplying means to high-frequency switching. Therefore, power loses at the power transistors of the power supplying means can be reduced significantly, and heat generation at the disk drive apparatus can also be reduced greatly. In addition, the voltage detecting means produces the detected pulse signal responding with the terminal voltages of the windings, and the state shifting means shifts the phases of the activation to the windings in response to the detected pulse signal. Furthermore, the activation control means activates the power transistors responding with the holding state so as to rotate the rotor in a predetermined direction. Therefore, no position detecting element is required, and the configuration of the disk drive apparatus is simplified.

Furthermore, each of the active periods of the first power transistors and the second power transistors is made larger than an electrical angle of 360/Q degrees. Therefore, two power transistors among the first power transistors or the second power transistors are activated simultaneously in an alteration of current paths. The alteration of current paths is thus smoothened, and the generated drive force has less pulsation. As a result, the vibration and the acoustic noise of the disk drive apparatus can be reduced.

Furthermore, the voltage detecting means comprises the voltage comparing means and the noise eliminating means. In the noise eliminating means, the output signal of the voltage comparing means is logically gated by the noise eliminating signal which is responding with the switching pulse signal. In particular, the output signal of the voltage comparing means is nullified during at least one of the first period including the changing timing from OFF to ON of the switching pulse signal and the second period including the changing timing from ON to OFF of the switching pulse signal. Therefore, it is possible to produce the detected pulse signal free from an influence of noise due to the high-frequency switching operation of the power transistors.

Furthermore, since the detected pulse signal responding with the output signal of the voltage comparing means is produced, it is possible to obtain the detected pulse signal promptly responding with the comparison result of the winding terminal voltages. Therefore, the alteration of current paths to the windings can be performed at accurate timing in response to the detected pulse signal of the voltage detecting means, and the disk can be rotated smoothly and accurately. Furthermore, in the case when speed control is performed in response to an output pulse signal such as the detected pulse signal of the voltage detecting means for example, the rotational speed of the disk can be controlled accurately. In other words, it is possible to attain an accurate rotation of the disk without an influence of high-frequency switching noises in the terminal voltages. As a result, an excellent disk drive apparatus can be realized, which reduces the power consumption, the disk vibration and the acoustic noise, according to the present invention.

A disk drive apparatus in accordance with another aspect of the present invention comprises:

- a head for at least reproducing a signal from a disk or recording a signal on a disk;
- processing means for at least processing an output signal from said head and outputting a reproducing information signal, or processing a recording information signal and outputting a signal into said head;
- a rotor, which has a field part generating field fluxes, and directly drives said disk;
- Q-phase windings (Q is an integer of 3 or more);
- voltage supplying means, which includes two output terminals for supplying a DC voltage;
- power supplying means having Q first power transistors and Q second power transistors for supplying a power to said Q-phase windings, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
- voltage detecting means for producing a detected pulse signal;
- state shifting means for shifting a holding state from one state to at least one other state in sequence responding with the detected pulse signal of said voltage detecting means;
- activation control means for controlling active periods of said Q first power transistors and said Q second power transistors responding with said holding state; and
- switching operation means for causing at least one of said Q first power transistors and said Q second power transistors to perform high-frequency switching corresponding to a command signal;

and that said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time, said activation control means produces Q-phase first activation control signals and Q-phase second activation control signals responding with said holding state of said state shifting means for controlling said active periods of said Q first power transistors and said Q second power transistors, each of said active periods being an electrical angle larger than 360/Q degrees, and said switching operation means includes:

current detecting means for producing a current detected signal responding with or corresponding to a current from said voltage supplying means to said Q-phase windings, and switching control means for comparing an output signal of said current detecting means with said command signal and producing a switching pulse signal responding with the comparison result, thereby making high-frequency switching operation of at least one power transistor among said Q first power transistors and said Q second power transistors responding with said switching pulse signal.

With this configuration, the switching operation means subjects the power transistors of the power supplying means to high-frequency switching. Therefore, power losses at the power transistors of the power supplying means can be reduced significantly, and heat generation at the motor can also be reduced greatly.

In addition, the voltage detecting means produces the detected pulse signal responding with the terminal voltages of the windings, and the state shifting means shifts the phases of the activation to the windings in response to the detected pulse signal.

Furthermore, the activation control means activates the power transistors responding with the holding state so as to rotate the rotor in a predetermined direction. Therefore, no position detecting element is required, and the configuration of the disk drive apparatus is simplified.

In addition, the state shifting means shifts the holding state from a first state to a second state after a first state adjust time from detection of said detected pulse signal, and further shifts the holding state from the second state to a third state after a second adjust time (the second adjust time >the first adjust time) from detection of the detected pulse signal. The activation control means produces Q-phase first activation control signals and Q-phase second activation control signals responding with the holding state of the state shifting means for controlling the active periods of the Q first power transistors and the Q second power transistors. With this configuration, each of the active periods of the Q first power transistors and the Q second power transistors is made larger than an electrical angle of 360/Q degrees. Furthermore, the switching operation means controls the supply current to the Q-phase windings from the voltage supplying means in correspondence with the command signal by making high-frequency switching operation of at least one power transistor among the Q first power transistors and the Q second power transistors. With this configuration, two power transistors among the Q first power transistors or the Q second power transistors are activated simultaneously in each alteration of current paths while the at least one power transistor performs the high-frequency switching operation so as to control the supply current responding with the command signal.

Therefore, the supply current to the Q-phase windings is controlled responding with the command signal even when the two power transistors are activated simultaneously, and the pulsation of the generated drive force can be reduced. Furthermore, the alteration of current paths is thus smoothened by the simultaneous activation of the two power transistors, the pulsation of the generated drive force can further be reduced. As a result, an excellent disk drive apparatus without a position detecting element can be realized, which reduces the power consumption, the disk vibration and the acoustic noise, according to the present invention.

The switching operation means can be configured so as to include current detecting means for obtaining a current detected signal responding with the supply current to the Q-phase windings from the voltage supplying means, and switching control means for comparing the output signal of the current detecting means with the command signal and producing a switching pulse signal responding with the comparison result, thereby making high-frequency switching operation of at least one power transistor among the Q first power transistors and the Q second power transistors responding with the switching pulse signal. With this configuration, it is easy to control the supply current to the Q-phase windings responding with the command signal even when the two power transistors among the Q first power transistors or the Q second power transistors are activated simultaneously during an altration of current paths.

The state shifting means can be configured so as to change the first adjust time and the second adjust time in response to an interval of the detected pulse signal. With this configuration, each of the active periods of the Q first power transistors and the Q second power transistors is easily made larger than 360/Q degrees (the period can be held at 130 degrees or more for example) even if the rotational speed of the rotor changes widely.

These and other configurations and operations will be described in detail in the explanations of embodiments according to the present invention.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 19 is a waveform diagram illustrating the operation of the PWM pulse part shown in FIG. 18 in accordance with the embodiment 1;

FIG. 20 is a circuit diagram of still another PWM pulse part 502 of the switching control part 22 in accordance with the embodiment 1;

It will be recognized that some or all of the Figures are schematic representations for purposes of illustration and do not necessarily depict the actual relative sizes or locations of the elements shown.

DETAILED DESCRIPTION OF THE INVENTION

Embodiments of the present invention will be described below referring to the accompanying drawings.

Embodiment 1

Figure 1:
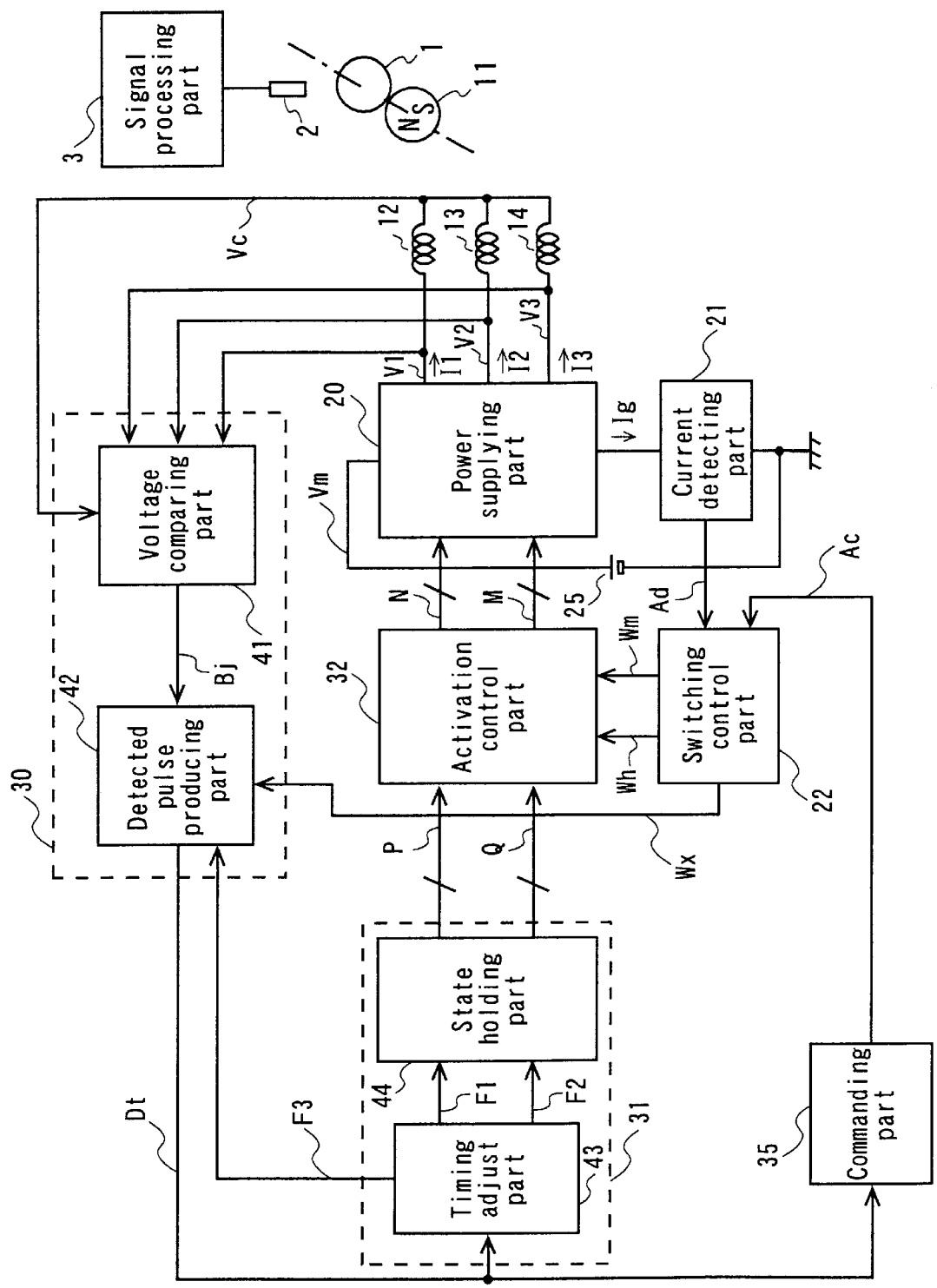
FIG. 1 is a diagram showing the configuration in accordance with embodiment 1 of the present invention.

FIGS. 1 to 12 show a configuration of a motor and a disk drive apparatus in accordance with embodiment 1 of the present invention. FIG. 1 shows a comprehensive configuration of the motor and the disk drive apparatus. A rotor 11 is provided with a field part for generating field fluxes from plural magnetic poles. Although a field part formed by a two-pole permanent magnet is herein shown, it is generally possible to form a multi-pole field part with a multi-pole magnet or with many magnetic pole pieces. Three-phase windings 12, 13 and 14 are disposed on a stator, each displaced from the others by substantially an electrical angle of 120 degrees. An electrical angle of 360 degrees corresponds to an angle width of one set of the N and S poles in the field part of the rotor. The one ends of the windings 12, 13 and 14 are common-connected, and the other ends thereof are used as power supply terminals and connected to the output terminals of a power supplying part 20. The three-phase windings 12, 13 and 14 generate three-phase magnetic fluxes by three-phase drive current signals I1, I2 and I3, and also generate a drive force by the interaction between the field part of the rotor 11 and the drive current signals, thereby providing the drive force to the rotor 11. A disk 1 is installed on the rotor 11 so as to be fixed thereto and directly rotated with the rotor 11.

Digital signals (for example, high-quality audio and video signals) have been recorded on the disk 1. Signals from the disk 1 are reproduced through a head 2, which is an optical head or a magnetic head for example. A signal processing part 3 processes output signals from the head 2 and outputs reproduced signals (for example, high-quality audio and video signals).

As another type, it is possible to record digital signals on the disk 1. In the case of this type, the signals are recorded on the disk 1 through the head 2, which is an optical head or a magnetic head for example. The signal processing part 3 supplies recording signals obtained by processing input recording signals (for example, high-quality audio and video signals) to the head 2, and the signals are recorded on the disk 1 by the head 2.

Figure 24:
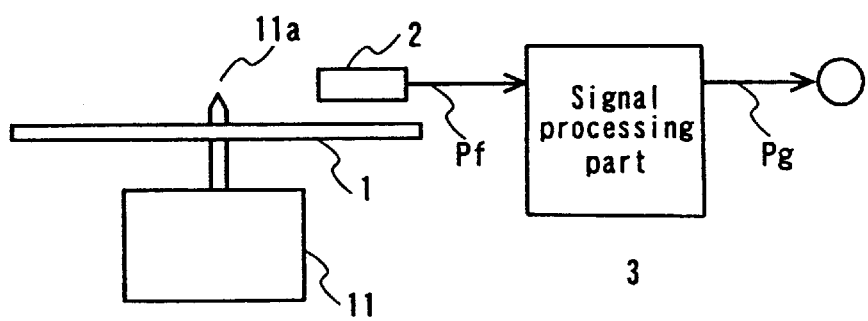
FIG. 24 is a block diagram relating to the signal of the disk drive apparatus in accordance with the embodiment 1 and the embodiment 2.
Figure 24:
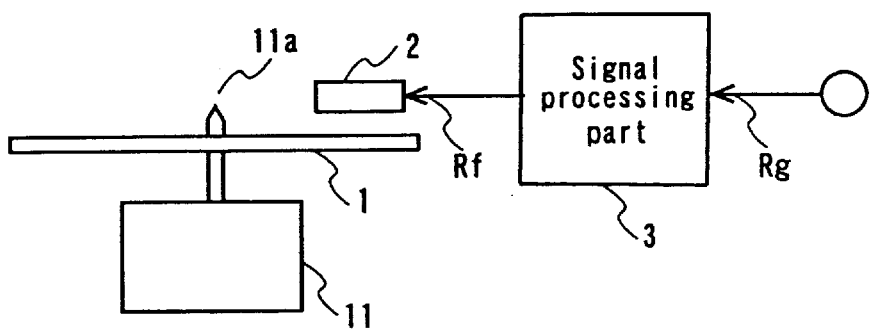

FIG. 24(*a*) shows an example of a disk drive apparatus for reproducing a signal in accordance with the embodiment 1. The disk 1 recorded a digital signal is directly rotated by the rotor 11 therewith. The head 2 reproduces the signal from the disk 1 and outputs a reproducing signal Pf. The signal processing part 3 digitally processes the reproducing signal Pf from the head 2 and outputs a reproduction signal Pg. The stator and windings of the apparatus are not shown herein.

FIG. 24(*b*) shows an example of a disk drive apparatus for recording a signal in accordance with the embodiment 1. The disk 1 is directly rotated by the rotor 11 therewith. The disk 1 is a recordable disk and capable of recording a digital signal at a high density. The signal processing part 3 digitally processes an input recording signal Rg and outputs a recording signal Rf to the head 2. The head 2 records the recording signal Rf on the disk 1.

A reproducing-only head, a recording-reproducing head or a recording-only head is used as the head 2. The disk drive apparatus of a reproducing-only type uses the reproducing-only head, and the disk drive apparatus of a recording-reproducing type uses the recording-reproducing head or the recording-only head.

Figure 2:
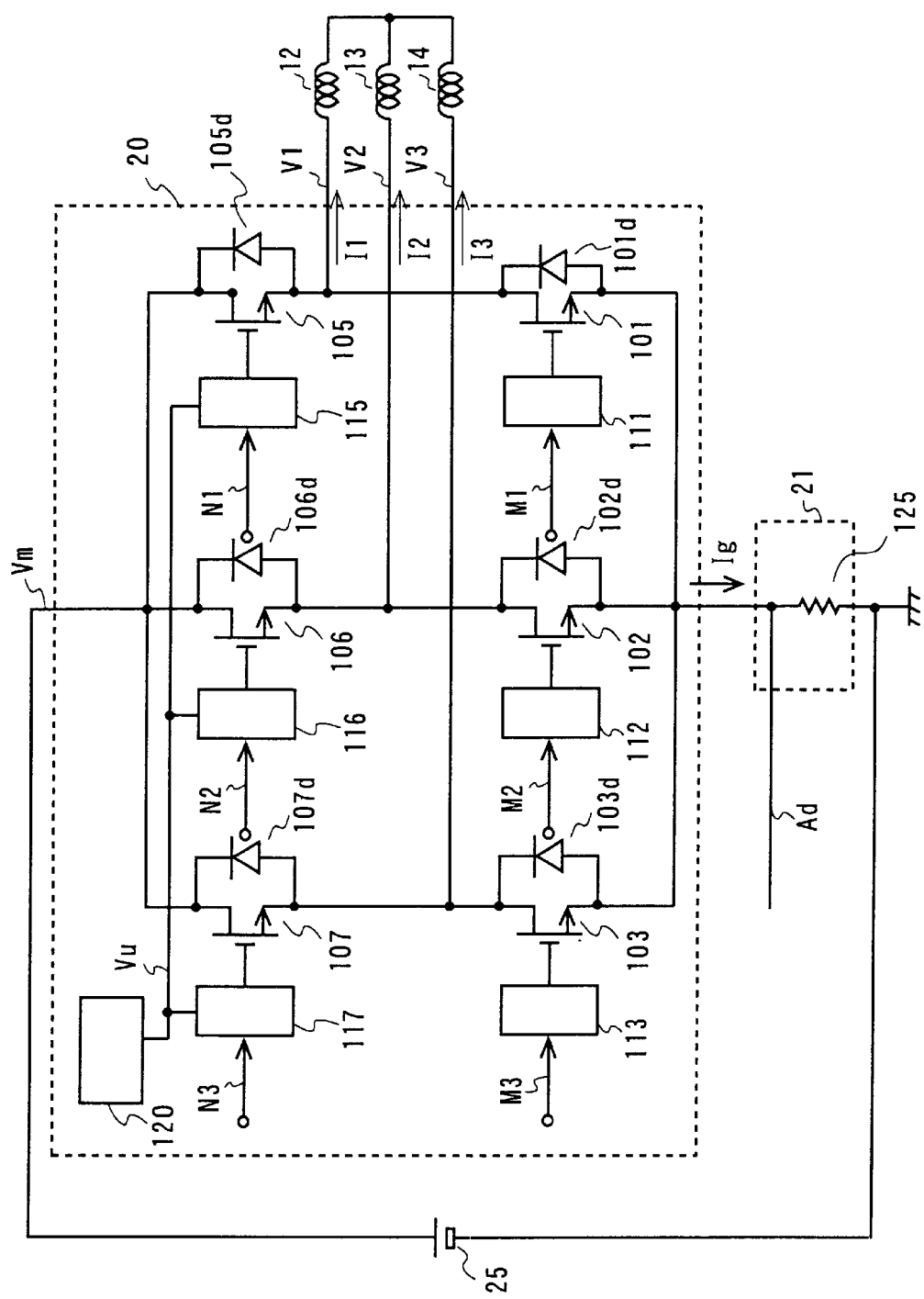
FIG. 2 is a circuit diagram of a power supplying part 20 and a current detecting part 21 in accordance with the embodiment 1.

The power supplying part 20 of FIG. 1 forms current paths from a voltage supplying part 25 to the three-phase windings 12, 13 and 14 in response to three-phase low-side activation control signals M1, M2 and M3 and three-phase high-side activation control signals N1, N2 and N3 of an activation control part 32, and supplies power to the three-phase windings 12, 13 and 14. FIG. 2 shows a configuration of the power supplying part 20 in accordance with the embodiment 1.

The power supplying part 20 of FIG. 2 comprises three low-side power transistors 101, 102 and 103 for forming power supply paths between the negative terminal (ground-side terminal) of the voltage supplying part 25 and each of the power supply terminals of the windings 12, 13 and 14, respectively. The power supplying part 20 further comprises three high-side power transistors 105, 106 and 107 for forming power supply paths between the positive terminal (Vm-side terminal) of the voltage supplying part 25 and each of the power supply terminals of the windings 12, 13 and 14, respectively. High-side power diodes 105*d*, 106*d* and 107*d* are connected reversely in parallel with the high-side power transistors 105, 106 and 107, respectively. Low-side power diodes 101*d*, 102*d* and 103*d* are also connected reversely in parallel with the low-side power transistors 101, 102 and 103, respectively. NMOS-FET power transistors are used as the low-side power transistors 101, 102 and 103 and the high-side power transistors 105, 106 and 107. The parasitic diodes reversely connected from the current flowing-out terminals to the current flowing-in terminals of the high-side FET power transistors 105, 106 and 107 are used as the high-side power diodes 105*d*, 106*d* and 107*d*, respectively. The parasitic diodes reversely connected from the current flowing-out terminals to the current flowing-in terminals of the low-side FET power transistors 101, 102 and 103 are used as the low-side power diodes 101*d*, 102*d* and 103*d*, respectively. The NMOS-FET power transistors are suitable to execute high-frequency switching operation and suitable to fabricate in one chip IC, but the high-side power transistors and the low-side power transistors are not limited to NMOS-FET transistors. Bipolar transistors or IGBT transistors may also be used. Furthermore, it is not necessary to use FET transistors having the same polarity, but it is possible to used FET transistors having different polarities. For example, PMOS-FET power transistors can be used as the high-side FET power transistors, and NMOS-FET power transistors can be used as the low-side FET power transistors.

The low-side activate circuits 111, 112 and 113 of the power supplying part 20 turn ON/OFF the low-side power transistors 101, 102 and 103 in response to the low-side activation control signals M1, M2 and M3, respectively. The low-side power transistors 101, 102 and 103 form current paths for supplying the negative parts of the drive current signals I1, I2 and I3 to the windings 12, 13 and 14. Since the low-side activation control signals M1, M2 and M3 are digital PWM signals (pulse width modulation signals) in their respective active periods, the low-side power transistors 101, 102 and 103 perform ON-OFF high-frequency switching operation. When the low-side power transistor 101 is ON for example, the terminal voltage V1 of the winding 12 becomes 0 V or nearly 0 V, and the negative part of the drive current signal I1 is supplied to the winding 12. When the low-side power transistor 101 turns OFF, the high-side power diode 105*d* or the high-side power transistor 105 turns ON, and the terminal voltage V1 of the winding 12 becomes substantially Vm, and the negative part of the drive current signal I1 is supplied continuously to the winding 12 by the inductive action of the winding 12. As a result, the terminal voltage V1 of the winding 12 becomes a PWM voltage, the level of which digitally changes between nearly 0 V and nearly Vm. In this way, the terminal voltages V1, V2 and V3 of the windings 12, 13 and 14 become PWM voltages respectively in their respective active periods of the low-side power transistors 101, 102 and 103.

The high-side activate circuits 115, 116 and 117 of the power supplying part 20 turn ON/OFF the high-side power transistors 105, 106 and 107 in response to the high-side activation control signals N1, N2 and N3, respectively. Usually, the high-side power transistors 105, 106 and 107 form current paths for supplying the positive parts of the drive current signals I1, I2 and I3 to the windings 12, 13 and 14, respectively.

A high-voltage output circuit 120 produces a high potential Vu higher than the positive potential Vm of the voltage supplying part 25 by a predetermined value and outputs the high potential Vu. Therefore, the high potential Vu can be applied to the control terminals of the high-side power transistors, and the N-channel FET power transistors can be fully turned ON.

The power losses of the high-side power diodes can be reduced by the complementary OFF-ON high-frequency switching of the high-side power transistors in phase with the low-side power transistors performing ON-OFF high-frequency switching.

A current detecting part 21 includes a current detecting resistor 125, and outputs a current detected signal Ad proportional to a composed supply current Ig to the three-phase windings 12, 13 and 14 via the low-side power transistors 101, 102 and 103 from the voltage supplying part 25.

Figure 3:
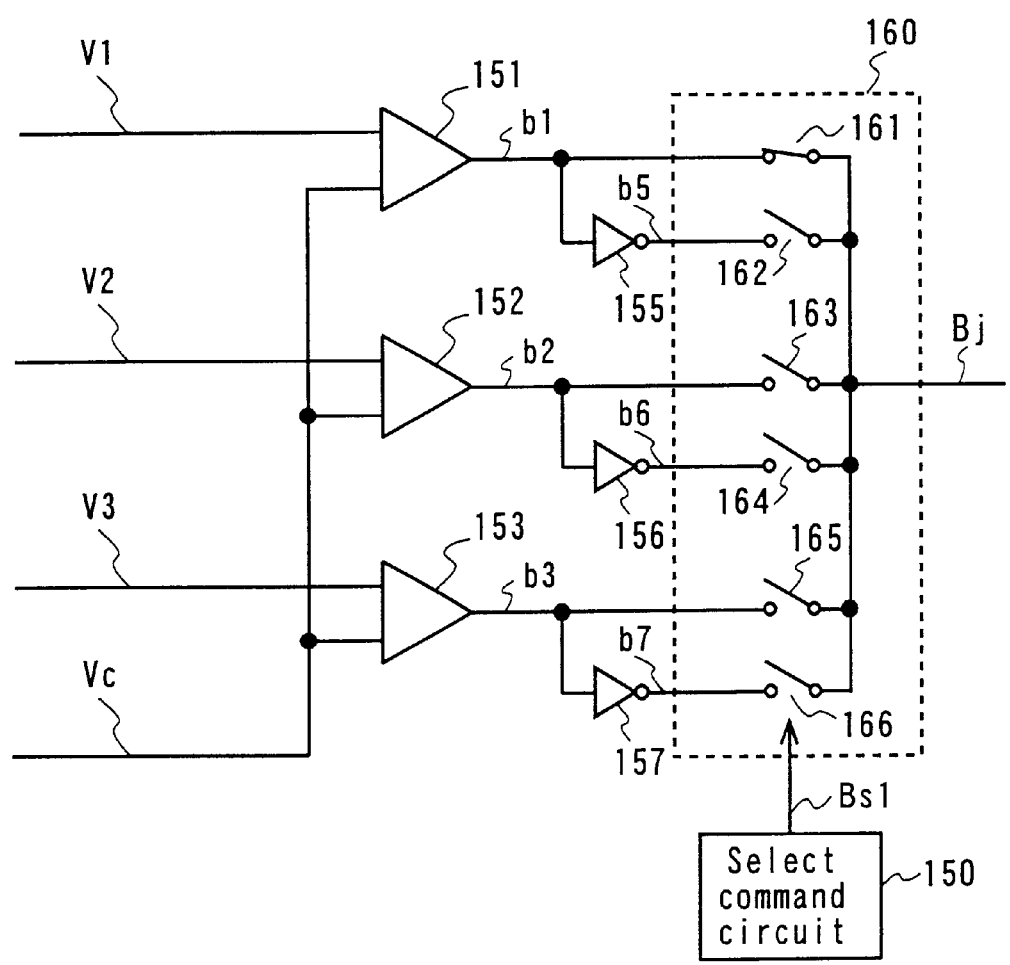
FIG. 3 is a circuit diagram of the voltage comparing part 41 of a voltage detecting part 30 in accordance with the embodiment 1.
Figure 4:
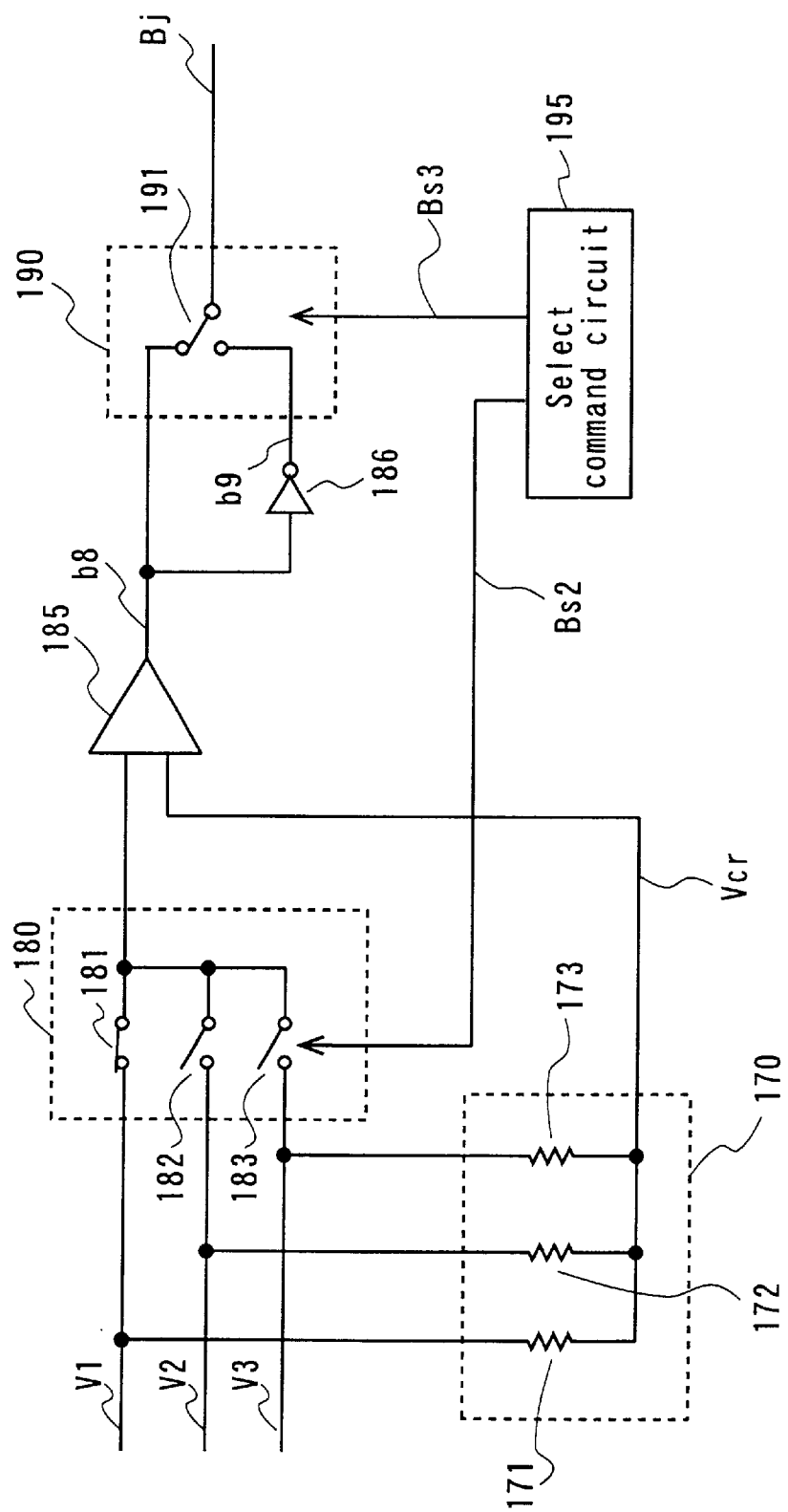
FIG. 4 is another circuit diagram of the voltage comparing part 41 of the voltage detecting part 30 in accordance with the embodiment 1.
Figure 5:
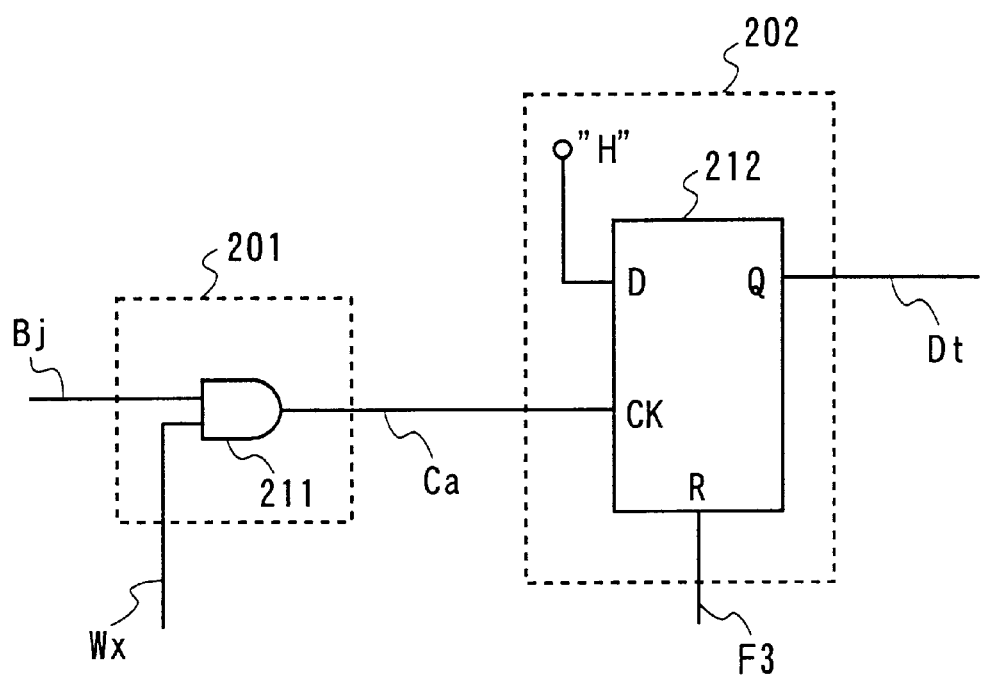
FIG. 5 is a circuit diagram of the detected pulse producing part 42 of the voltage detecting part 30 in accordance with the embodiment 1.

The voltage detecting part 30 of FIG. 1 comprises a voltage comparing part 41 and a detected pulse producing part 42. The three-phase terminal voltages V1, V2 and V3 at the power supply terminals of the three-phase windings 12, 13 and 14 and the common terminal voltage Vc at the common-connected terminal of the three-phase windings 12, 13 and 14 are input to the voltage comparing part 41. The voltage comparing part 41 substantially compares the three-phase terminal voltages with the common terminal voltage selectively and directly, and outputs a selective voltage compared signal Bj responding with the result of the comparison. The detected pulse producing part 42 outputs a detected pulse signal Dt by eliminating a high-frequency switching noise included in the selective voltage compared signal Bj. FIG. 3 or FIG. 4 shows a configuration of the voltage comparing part 41. FIG. 5 shows a configuration of the detected pulse producing part 42.

The three comparator circuits 151, 152 and 153 of the voltage comparing part of FIG. 3 compare the three-phase terminal voltages V1, V2 and V3 with the common terminal voltage Vc, and outputs three-phase compared pulse signals b1, b2 and b3 responding with the result of the comparison. Inverter circuits 155, 156 and 157 output pulse signals b5, b6 and b7 by inverting the compared pulse signals b1, b2 and b3. The switches 161, 162, 163, 164, 165 and 166 of a signal selecting circuit 160 select one of the pulse signals b1, b2, b3, b5, b6 and b7 in response to the select command signal Bs1 of the select command circuit 150, and outputs the selected pulse signal as the selective voltage compared signal Bj. The select command circuit 150 outputs the select command signal Bs1 responding with the holding state of a state shifting part 31 described later. A pulse signal in the pulse signals b1, b2, b3, b4, b5 and b6, which corresponds to the states of the activation to the windings 12, 13 and 14, is selected and output as the selective voltage compared signal Bj.

FIG. 4 shows another configuration of the voltage comparing part. The voltage composing circuit 170 of the voltage comparing part of FIG. 4 produces a composed common voltage Vcr by composing the three-phase terminal voltages V1, V2 and V3 with resistors 171, 172 and 173. The switches 181, 182 and 183 of a first signal selecting circuit 180 selectively input one of the terminal voltages V1, V2 and V3 to a comparator circuit 185 in response to the first select command signal Bs2 of a select command circuit 195. The comparator circuit 185 compares the selected terminal voltage with the composed common voltage Vcr and outputs a compared pulse signal b8. An inverter circuit 186 outputs a pulse signal b9 by inverting the compared pulse signal b8.

The switch 191 of a second signal selecting circuit 190 selects one of the pulse signals b8 and b9 depending on the second select command signal Bs3 of the select command circuit 195, and outputs the signal as the selective voltage compared signal Bj. The select command circuit 195 outputs the first select command signal Bs2 and the second select command signal Bs3 responding with the holding state of the state shifting part 31 described later. A pulse signal in the pulse signals b8 and b9, which corresponds to the states of the activation to the three-phase windings 12, 13 and 14, is selected and output as the selective voltage compared signal Bj.

The noise eliminating circuit 201 of the detected pulse producing part of FIG. 5 eliminates a switching noise which is included in the selective voltage compared signal Bj because of the high-frequency switching operation of the power supplying part 20, so as to produce the output signal Ca without an influence of the switching operation of the power transistors. The noise eliminating circuit 201 comprises an AND circuit 211 for example, and logically gates the selective voltage compared signal Bj with the noise eliminating signal Wx of a switching control part 22 described later. In other words, the output signal Bj of the voltage comparing part 41 is logically gated by the noise eliminating signal Wx. As a result, the output signal Ca of the noise eliminating circuit 201 becomes irrelevant to the selective voltage compared signal Bj when the noise eliminating signal Wx is "L" (a low-potential state). When the noise eliminating signal Wx is "H" (a high-potential state), the level of the selective voltage compared signal Bj is output directly. As a result, even if noise pulses occur in the selective voltage compared signal Bj owing to the high-frequency switching operation of the power supplying part 20, the noise pulses are removed from the output signal Ca of the noise eliminating circuit 201. It is therefore possible to obtain an accurate pulse signal responding with the result of the comparison of the terminal voltages of the windings.

A pulse generating circuit 202 changes the level of the detected pulse signal Dt to "H" at the arrival moment of the rising edge of the output signal Ca of the noise eliminating circuit 201. The pulse generating circuit 202 comprises a D-type flip-flop circuit 212 for example. The "H" level input to the data terminal is input at the rising edge of the output signal Ca of the noise eliminating circuit 201 which is input to the clock terminal of the flip-flop circuit 212. As a result, the level of the detected pulse signal Dt changes to "H" at the rising edge of the output signal Ca of the noise eliminating circuit 201, and this state is held. The state shifting part 31 described later produces a third timing adjust signal F3 after a predetermined time from the rising point of the detected pulse signal Dt, and the third timing adjust signal F3 resets the state of the D-type flip-flop circuit 212 of the pulse generating circuit 202 to "L." Therefore, the state of the detected pulse signal Dt changes in direct response to the rising edge of the selective voltage compared signal Bj from which noise pulses are eliminated. The state of the detected pulse signal Dt is thus held until the next third timing adjust signal F3 arrives.

Figure 6:
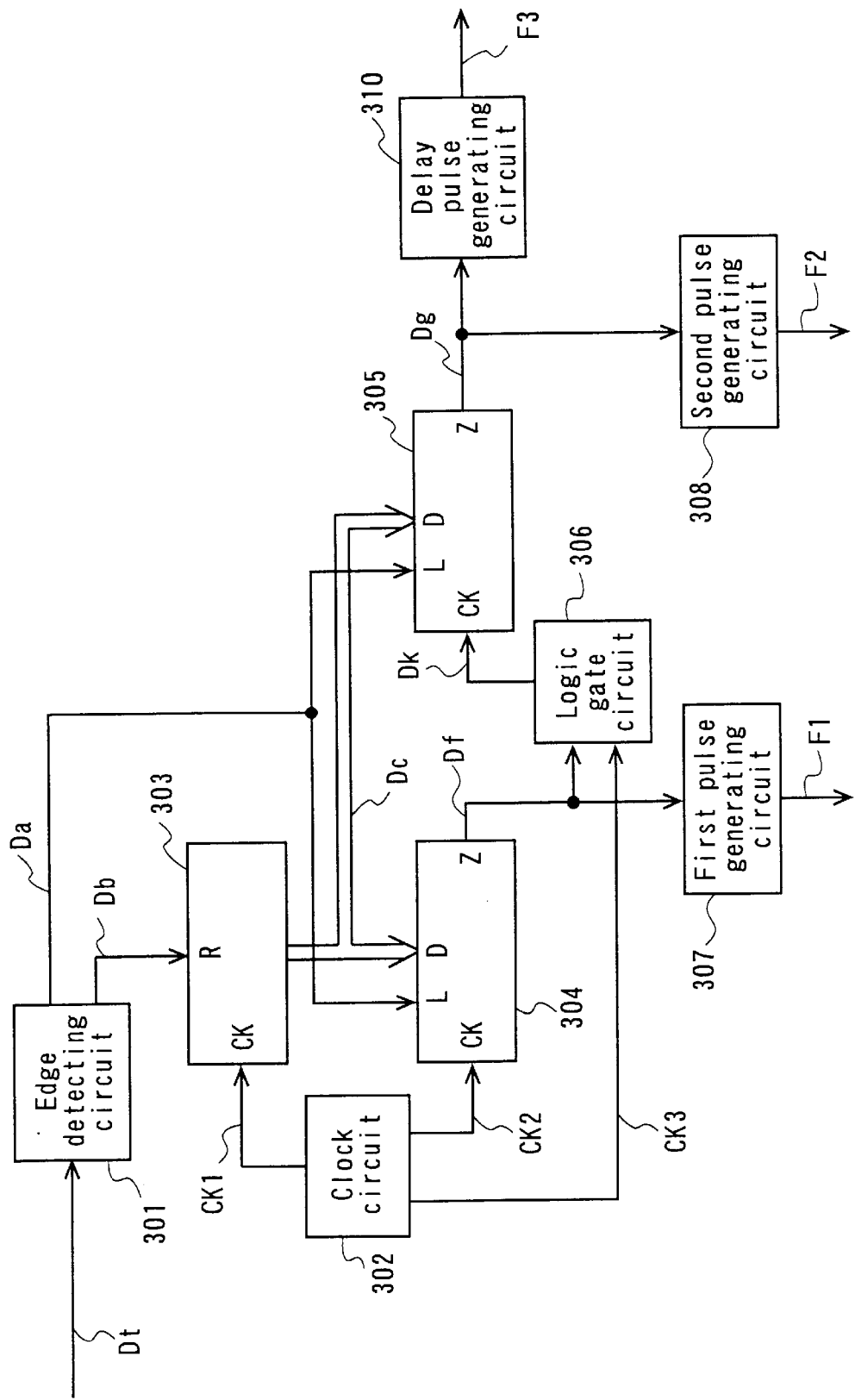
FIG. 6 is a circuit diagram of the timing adjust part 43 of a state shifting part 31 in accordance with the embodiment 1.
Figure 7:
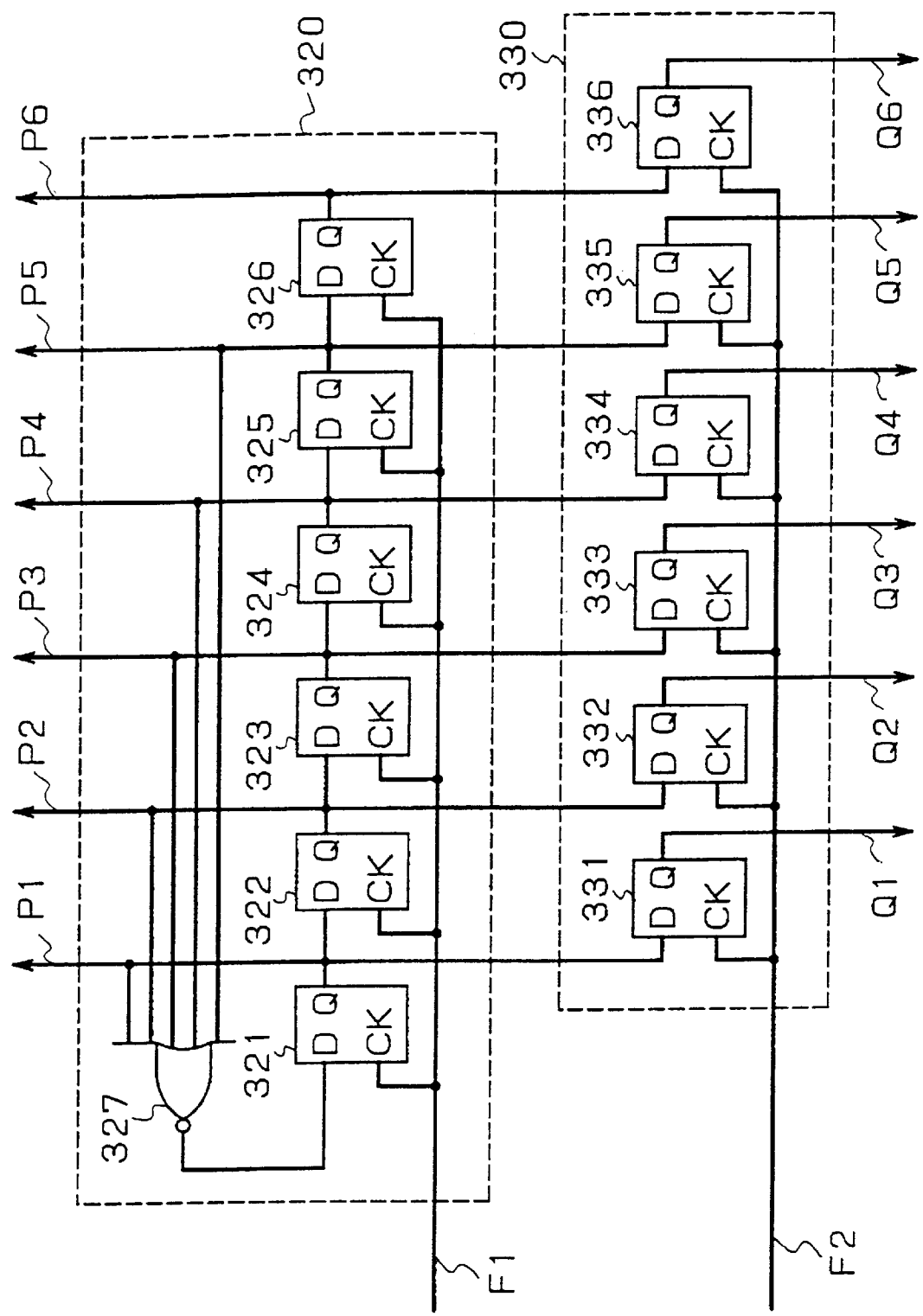
FIG. 7 is a circuit diagram of the state holding part 44 of the state shifting part 31 in accordance with the embodiment 1.

The state shifting part 31 of FIG. 1 comprises a timing adjust part 43 and a state holding part 44. The timing adjust part 43 outputs a first timing adjust signal F1 delayed by a first adjust time T1, a second timing adjust signal F2 delayed by a second adjust time T2 and a third adjust timing signal F3 delayed by a third adjust time T3 from every arrival of the rising edge of the detected pulse signal Dt of the voltage detecting part 30. The state holding part 44 changes its holding state in response to the first timing adjust signal F1 and the second timing adjust signal F2, and outputs first state signals P1 to P6 and second state signals Q1 to Q6 responding with the holding state. FIG. 6 shows a configuration of the timing adjust part 43, and FIG. 7 shows a configuration of the state holding part 44.

The edge detecting circuit 301 of the timing adjust part of FIG. 6 produces a first differential pulse signal Da and a second differential pulse signal Db at the rising edge of the detected pulse signal Dt. The second differential pulse signal Db is output immediately after the first differential pulse signal Da. At the pulse edge of the first differential pulse signal Da, a value corresponding to the internal data signal Dc of the first counter circuit 303 is loaded to a second counter circuit 304 and a third counter circuit 305. The first counter circuit 303 is then reset at the pulse edge of the second differential pulse signal Db. In other words, a value corresponding to the internal data signal Dc of the first counter circuit 303 is loaded as the internal data of the second counter circuit 304 and the third counter circuit 305 at the rising edge of the detected pulse signal Dt. The internal state of the first counter 303 is reset to zero or a predetermined value at the rising edge of the detected pulse signal Dt.

A clock circuit 302 outputs a first clock signal CK1, a second clock signal CK2 and a third clock signal CK3. The first clock signal CK1 is input to the first counter circuit 303 as the clock signal of the counter, and the first counter circuit 303 counts up the internal data signal Dc at every arrival of the rising edges of the first clock signal CK1. Besides, when the internal data of the first counter circuit 303 reaches to a predetermined value, the first counter circuit 303 stops further counting up and holds the value. The second clock signal CK2 is input to the second counter circuit 304 as the clock signal of the counter, and the second counter circuit 304 counts down the internal data at every arrival of the rising edges of the second clock signal CK2. When the internal data of the second counter circuit 304 reaches to zero or a predetermined value, the second counter circuit 304 stops further counting down and outputs a first zero pulse signal Df. A first pulse generating circuit 307 differentiates the first zero pulse signal Df and outputs the first timing adjust signal F1 at the rising edge of the first zero pulse signal Df. A logic gate circuit 306 holds an output clock signal Dk at the "L" state before the generation of the first zero pulse signal Df. After the generation of the first zero pulse signal Df, the logic gate circuit 306 outputs a third clock signal CK3 as the output clock signal Dk to the third counter circuit 305. The output clock signal Dk is input to the third counter circuit 305 as the clock signal of the counter, the third counter circuit 305 counts down its internal data at every arrival of the rising edges of the output clock signal Dk. When the internal data of the third counter circuit 305 reaches to zero or a predetermined value, the third counter circuit 305 stops further counting down and outputs a second zero pulse signal Dg. A second pulse generating circuit 308 differentiates the second zero pulse signal Dg and outputs the second timing adjust signal F2 at the rising edge of the second zero pulse signal Dg. A delay pulse generating circuit 310 delays a signal by a predetermined time from the generation moment of the second zero pulse signal Dg and outputs the third timing adjust signal F3 as a differential pulse signal. The delay pulse generating circuit 310 has a configuration similar to those of the second counter circuit 305 and the second pulse generating circuit 308.

Figure 13:
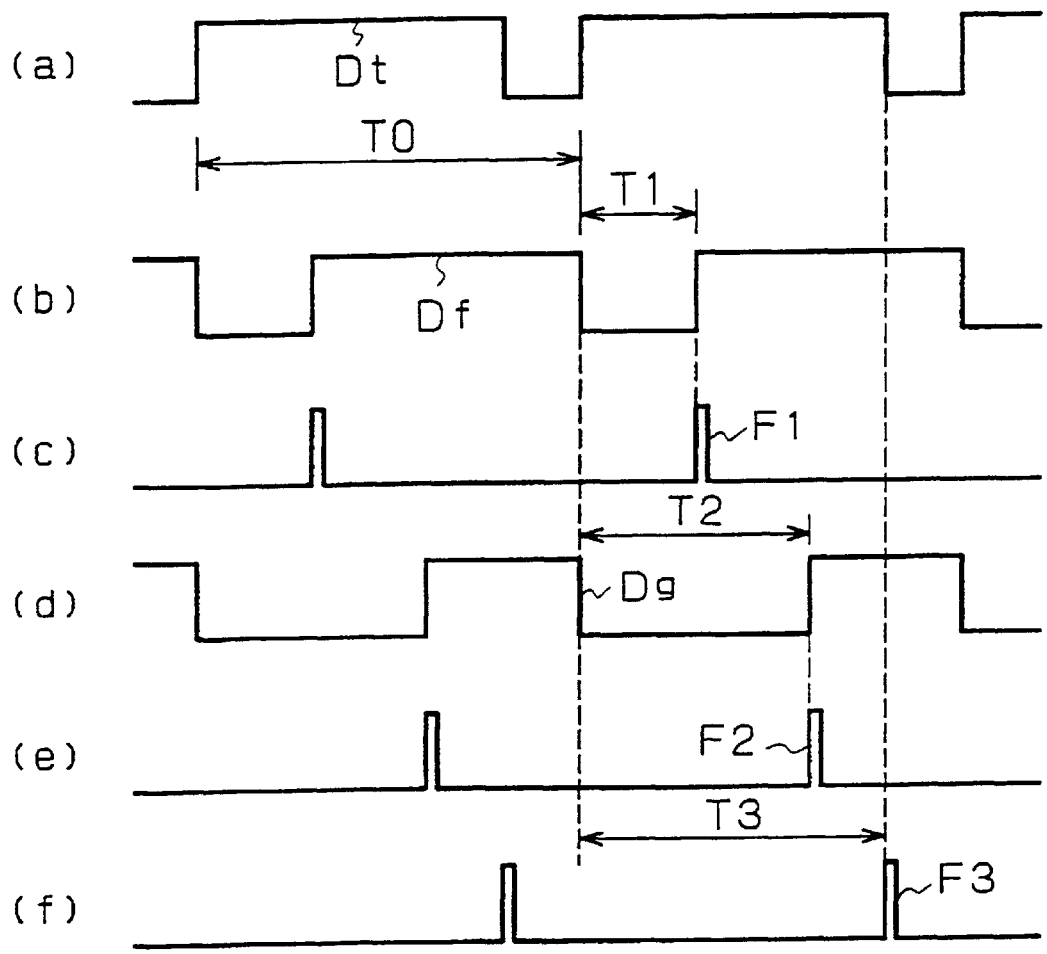
FIG. 13 is a waveform diagram illustrating the operation of the timing adjust part 43 of the state shifting part 31 in accordance with the embodiment 1.

The relationship among these signal waveforms is exemplified in FIG. 13 (the abscissa of FIG. 13 represents time). The first counter circuit 303 produces the count value corresponding to the time interval T0 (pulse interval T0) between the successive rising edges of the detected pulse signal Dt shown in the part (a) of FIG. 13. The second counter circuit 304 outputs the first zero pulse signal Df delayed by a first adjust time T1 (T1<T0), the first adjust time T1 being substantially proportional to the time interval T0 (see the part (b) in FIG. 13). As a result, the first timing adjust signal F1 becomes a pulse signal delayed by the first adjust time T1 substantially proportional to the time interval T0 from the rising edge of the detected pulse signal Dt (see the part (c) in FIG. 13). After the rising edge of the first zero pulse signal Df is generated, the third counter circuit 305 outputs the second zero pulse signal Dg delayed by a predetermined time substantially proportional to the time interval T0 (see the part (d) in FIG. 13). As a result, the second timing adjust signal F2 becomes a pulse signal delayed by the second adjust time T2 (T1<T2<T0) substantially proportional to the time interval T0 (see the part (e) in FIG. 13) from the generation moment of the rising edge of the detected pulse signal Dt. In a similar way, the delay pulse generating circuit 310 outputs the third timing adjust signal F3 delayed by a predetermined time from the generation moment of the rising edge of the second zero pulse signal Dg (see the part (f) in FIG. 13). As a result, the third timing adjust signal F3 becomes a pulse signal delayed by the third adjust time T3 (T2<T3<T0) substantially proportional to the time interval T0 from the generation of the rising edge of the detected pulse signal Dt. The third timing adjust signal F3 is input to the pulse generating circuit 202 of the detected pulse producing part 42, and the detected pulse signal Dt is reset by the generation of the third timing adjust signal F3 (see the part (a) in FIG. 13).

The state holding part 44 of FIG. 7 comprises a first state holding circuit 320 and a second state holding circuit 330. The first state holding circuit 320 includes six D-type flip-flops 321, 322, 323, 324, 325 and 326, and are designed so that one of the flip-flops becomes the "H" state and the other flip-flops become the "L" state. The states of the flip-flops 321, 322, 323, 324, 325 and 326 are shifted at the rising edge of the first timing adjust signal F1, and the "H" state moves in sequence just as in the case of a ring counter. The first state holding circuit 320 outputs the internal states of the six flip-flops 321, 322, 323, 324, 325 and 326 as first state signals P1, P2, P3, P4, P5 and P6. The second state holding circuit 330 comprises six D-type flip-flops 331, 332, 333, 334, 335 and 336. The first state signals P1, P2, P3, P4, P5 and P6 are input to the data input terminals of the flip-flops 331, 332, 333, 334, 335 and 336, respectively. At the rising edge of the second timing adjust signal F2, the first state signals P1, P2, P3, P4, P5 and P6 are input to the internal states of the flip-flops 331, 332, 333, 334, 335 and 336, and their outputs are changed. The second state holding circuit 330 outputs the internal states of the six flip-flops 331, 332, 333, 334, 335 and 336 as the second state signals Q1, Q2, Q3, Q4, Q5 and Q6. Thus, the holding state of the state holding part 44, which is the composed state of the first state signals P1 to P6 and the second state signals Q1 to Q6, is shifted from a first state to a second state at the rising edge of the first timing adjust signal F1, and further shifted from the second state to a third state at the rising edge of the second timing adjust signal F2.

Figure 8:
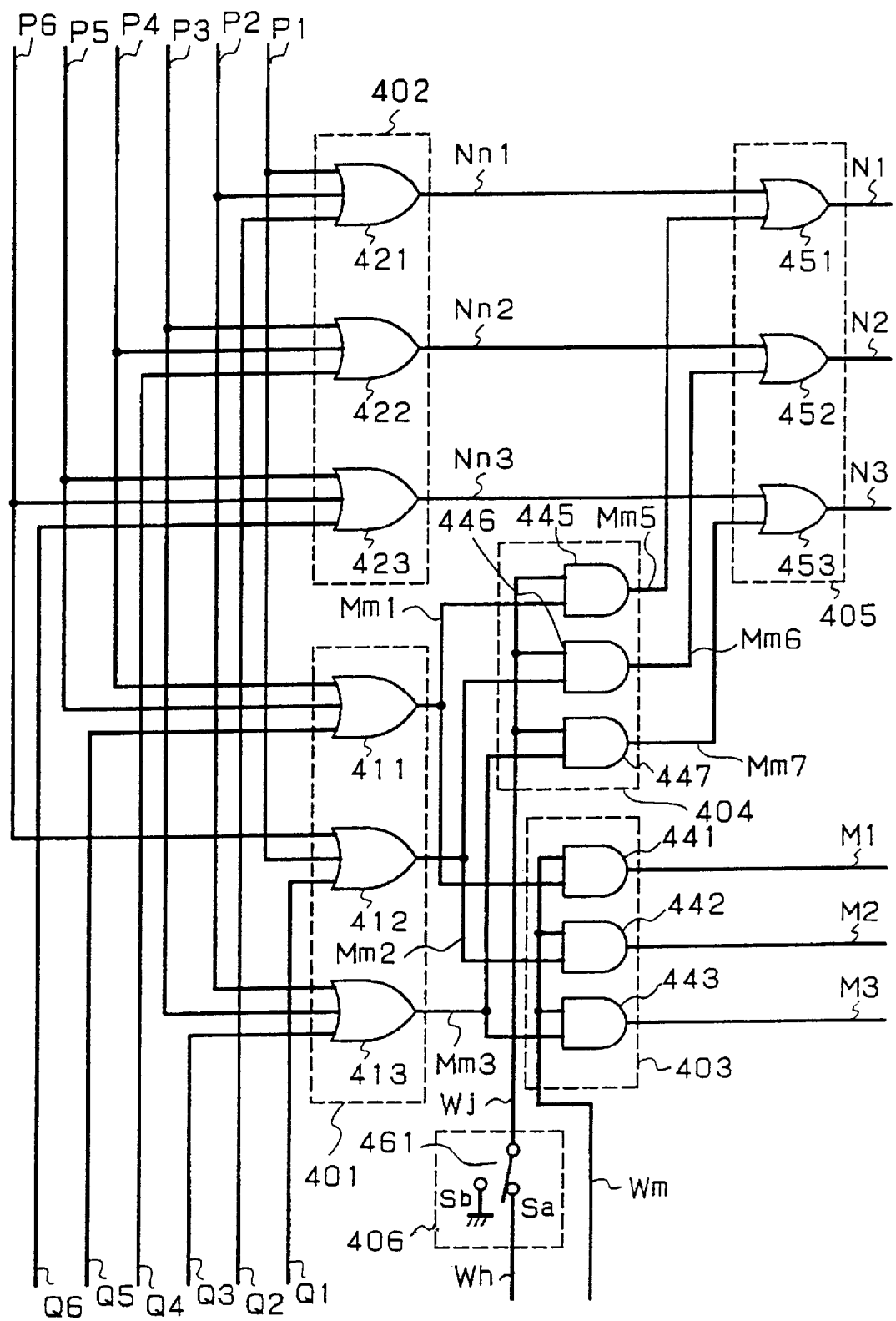
FIG. 8 is a circuit diagram of an activation control part 32 in accordance with the embodiment 1.

The activation control part 32 of FIG. 1 outputs the low-side activation control signals M1, M2 and M3 and the high-side activation control signals N1, N2 and N3 responding with the holding state (the first state signals P1 to P6 and the second state signals Q1 to Q6) of the state shifting part 31. Therefore, the activation periods of the power transistors are determined by the first state signals and the second state signals. Furthermore, the low-side activation control signals M1, M2 and M3 and the high-side activation control signals N1, N2 and N3 of the activation control part 32 respond with the main PWM pulse signal Wm and the auxiliary PWM pulse signal Wh of the switching control part 22. FIG. 8 shows a configuration of the activation control part 32.

The first selecting circuit 401 of FIG. 8 produces three-phase first selecting signals Mm1, Mm2 and Mm3 responding with the first state signals P1 to P6 and the second state signals Q1 to Q6 of the state shifting part 31. The "H" state periods of the first selecting signals Mm1, Mm2 and Mm3 corresponds to the active periods of the low-side power transistors 101, 102 and 103 of the power supplying part 20, respectively. The second selecting circuit 402 produces three-phase second selecting signals Nn1, Nn2 and Nn3 responding with the first state signals P1 to P6 and the second state signals Q1 to Q6 of the state shifting part 31. The "H" state periods of the second selecting signals Nn1, Nn2 and Nn3 corresponds to the active periods of the high-side power transistors 105, 106 and 107 of the power supplying part 20, respectively.

A first pulse composing circuit 403 produces the three-phase low-side activation control signals M1, M2 and M3 by composing logically the first selecting signals Mm1, Mm2 and Mm3 and the main PWM pulse signal Wm of the switching control part 22. Each of the low-side activation control signals M1, M2 and M3 becomes coincident with the main PWM pulse signal Wm in each active period. By the connection of the switch circuit 461 of the auxiliary selecting circuit 406, a high-side auxiliary signal Wj becomes a signal coincident with the auxiliary PWM pulse signal Wh of the switching control part 22 or becomes the "L" state. A second pulse composing circuit 404 produces three-phase auxiliary activation control signals Mm5, Mm6 and Mm7 by composing logically the first selecting signals Mm1, Mm2 and Mm3 and the high-side auxiliary signal Wj. In the case when the switch circuit 461 of the auxiliary selecting circuit 406 is connected to its Sa side, the high-side auxiliary signal Wj becomes coincident with the auxiliary PWM pulse signal Wh. So each of the auxiliary activation control signals Mm5, Mm6 and Mm7 becomes coincident with the auxiliary PWM pulse signal Wh in each "H" state period of the first selecting signals Mm1, Mm2 and Mm3. In the case when the switch circuit 461 of the auxiliary selecting circuit 406 is connected to its Sb side, the high-side auxiliary signal Wj becomes the "L" state, and the auxiliary activation control signals Mm5, Mm6 and Mm7 of the second pulse composing circuit 404 become the "L" state. A third pulse composing circuit 405 composes the second selecting signals Nn1, Nn2 and Nn3 and the auxiliary activation control signals Mn5, Mm6 and Mm7 respectively, and produces the high-side activation control signals N1, N2 and N3.

Figure 14:
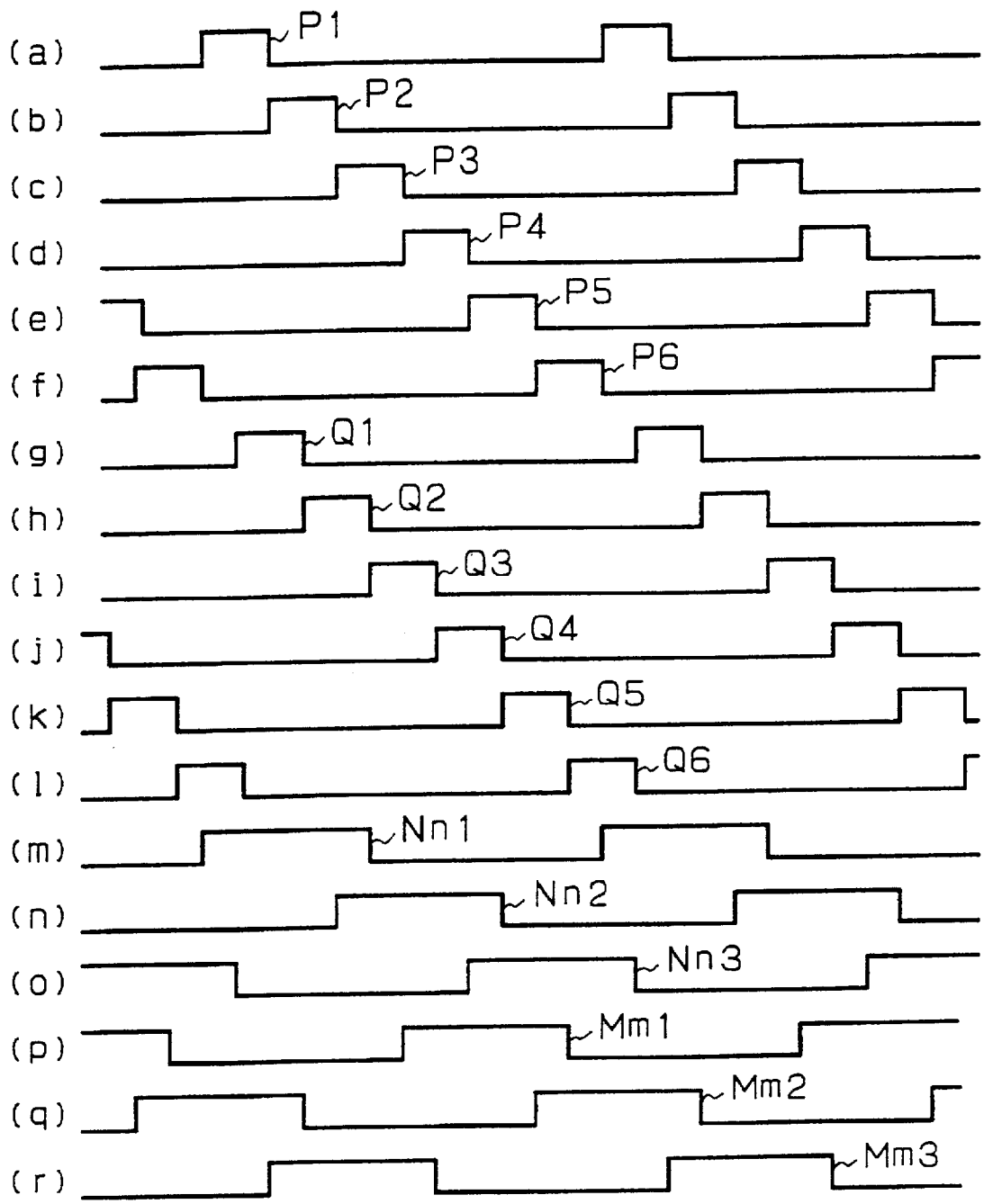
FIG. 14 is a waveform diagram illustrating the operation of the state holding part 44 of the state shifting part 31 and the operation of the first selecting means 401 and the second selecting means 402 of the activation control part 32 in accordance with the embodiment 1.

FIG. 14 shows the relationship among the first state signals P1 to P6, the second state signals Q1 to Q6, the first selecting signals Mm1, Mm2 and Mn3, and the second selecting signals Nn1, Nn2 and Nn3. The abscissa of FIG. 14 represents time. The first state signals P1 to P6 are six-phase signals which are shifted at every generation of the first timing adjust signal F1 (see the parts (a) to (f) in FIG. 14). The second state signals Q1 to Q6 are six-phase signals which are shifted at every generation of the second timing adjust signal F2 (see the parts (g) to (l) in FIG. 14). The first selecting signals Mm1, Mm2 and Mm3 are produced by composing logically the first state signals P1 to P6 and the second state signals Q1 to Q6, and each of the "H" periods of the three-phase first selecting signals Mm1, Mn2 and Mm3 becomes larger than an electrical angle of 120 degrees (see the parts (p) to (r) in FIG. 14). More specifically, the first selecting signals Mm1, Mm2 and Mm3 become three-phase signals, each having a "H" period equal to about 140 degrees. An electrical angle of 360 degrees corresponds to the rotation angle of the one set of the N and S poles of the rotor. In a similar way, the second selecting signals Nn1, Nn2 and Nn3 are produced by composing logically the first state signals P1 to P6 and the second state signals Q1 to Q6, each of the "H" periods of the three-phase second selecting signals becomes larger than an electrical angle of 120 degrees (see the parts (m) to (o) in FIG. 14). More specifically, the second selecting signals Nn1, Nn2 and Nn3 become three-phase signals, each having a "H" period equal to about 140 degrees. In addition, the first selecting signal and the second selecting signal being in phase with each other are opposite-phase signals having a phase difference of an electrical angle of 180 degrees (for example, Mm1 and Nn1).

The commanding part 35 of FIG. 1 comprises a speed detecting mechanism, and the command signal Ac of the commanding part 35 is a voltage signal produced by the speed detecting mechanism. The speed detecting mechanism of the commanding part 35 detects the rotational speed of the disk 1 and the rotor 11 with the detected pulse signal Dt of the voltage detecting part 30, and produces the command signal Ac responding with the difference between the rotational speed of the disk 1 and its target speed. Therefore, the command signal Ac of the commanding part 35 is a voltage signal responding with the output pulse signal Dt of the voltage detecting part 30. Besides, the detection of the rotational speed and the generation of the command signal can also be attained by using a pulse signal responding with a comparison result of terminal voltages of the voltage detecting part 30.

Figure 9:
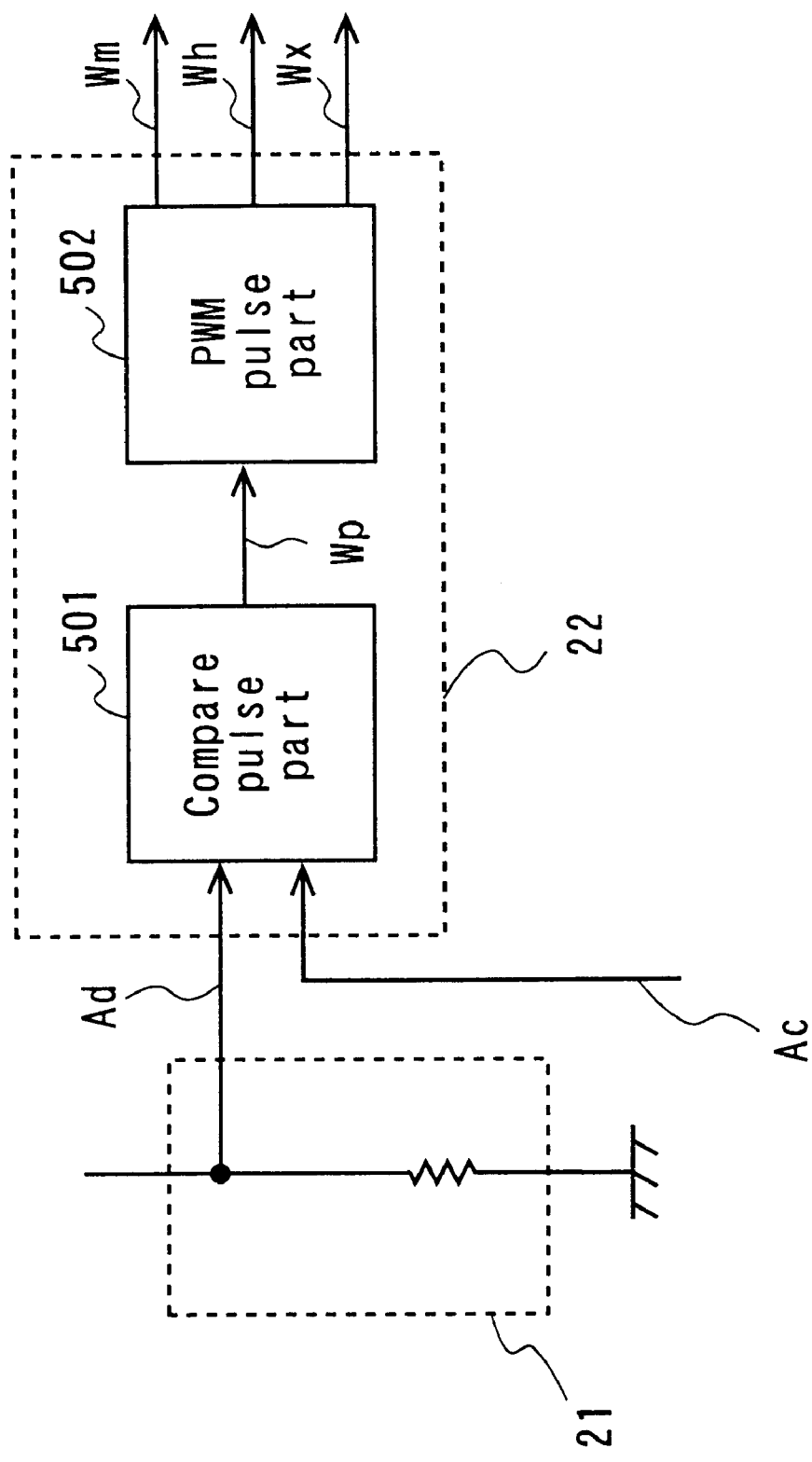
FIG. 9 is a circuit diagram of a switching control part 22 in accordance with the embodiment 1.

The switching control part 22 of FIG. 1 compares the current detected signal Ad of the current detecting part 21 with the command signal Ac of the command part 35, and outputs the main PWM pulse signal Wm, the auxiliary PWM pulse signal Wh and the noise eliminating signal Wx responding with the comparison result. The main PWM pulse signal Wm and the auxiliary PWM pulse signal Wh of the switching control part 22 are input to the activation control part 32, and the noise eliminating signal Wx of the switching control part 22 is input to the detected pulse producing part 42 of the voltage detecting part 30. FIG. 9 shows a configuration of the switching control part 22.

Figure 10:
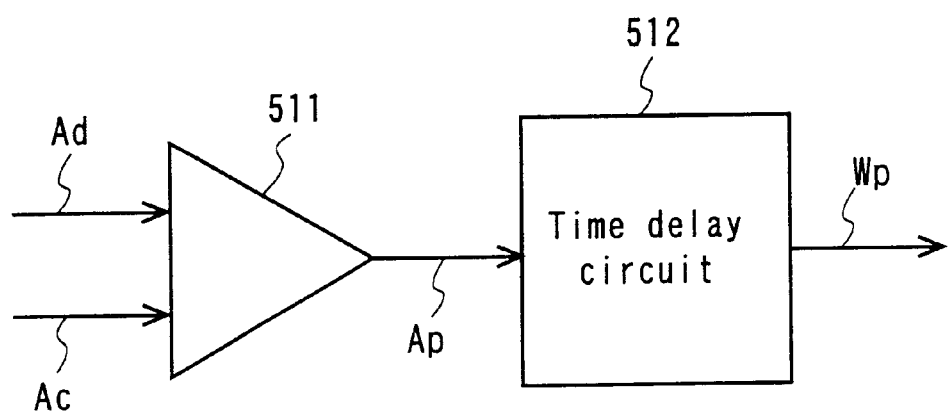
FIG. 10 is a circuit diagram of a compare pulse part 501 of the switching control part 22 in accordance with the embodiment 1.
Figure 11:
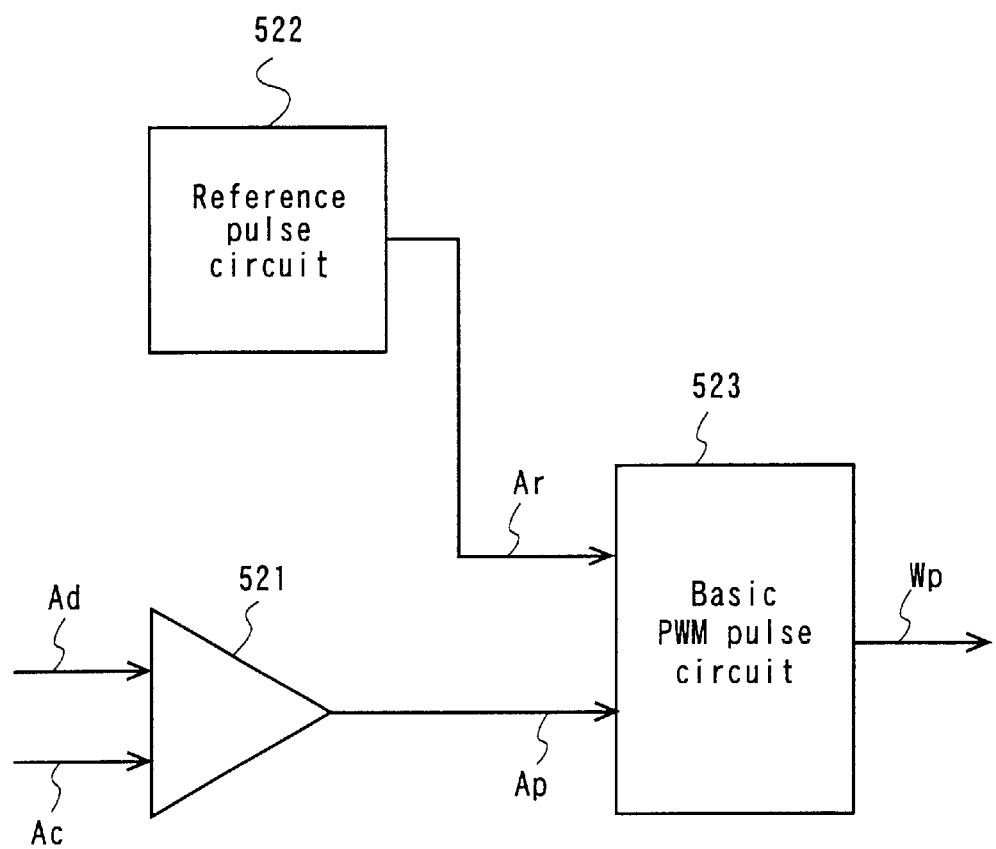
FIG. 11 is a circuit diagram of another compare pulse part 501 of the switching control part 22 in accordance with the embodiment 1.

The switching control part 22 of FIG. 9 comprises a compare pulse part 501 and a PWM pulse part 502. The compare pulse part 501 compares the current detected signal Ad with the command signal Ac, and outputs a basic PWM pulse signal Wp responding with the result of the comparison. The PWM pulse part 502 produces the main PWM pulse signal Wm, the auxiliary PWM pulse signal Wh and the noise eliminating signal Wx from the basic PWM pulse signal Wp. FIG. 10 or FIG. 11 shows a configuration of the compare pulse part 501, and FIG. 12 shows a configuration of the PWM pulse part 502.

Figure 15:
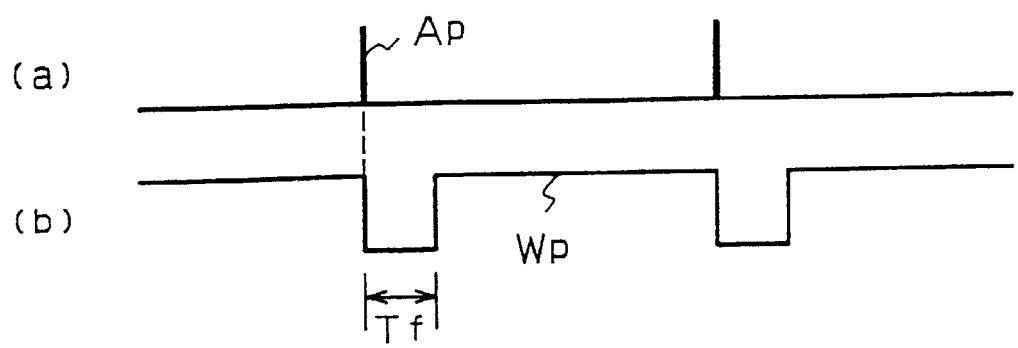
FIG. 15 is a waveform diagram illustrating the operation of the compare pulse part shown in FIG. 10 in accordance with the embodiment 1.

The compare pulse part shown in FIG. 10 comprises a compare circuit 511 and a time delay circuit 512. The compare circuit 511 compares the command signal Ac with the current detected signal Ad, and changes its compare signal Ap to "H" when the current detected signal Ad becomes larger than the command signal Ac. The basic PWM pulse signal Wp of the time delay circuit 512 becomes "L" in a predetermined time Tf just after every arrival of the rising edges of the compare signal Ap as a trigger. The compare signal Ap changes to "H" after the predetermined time Tf has passed. Parts (a) and (b) in FIG. 15 show the relationship between the compare signal Ap and the basic PWM pulse signal Wp. The abscissa of FIG. 15 represents time. The compare signal Ap is "L" when the current detected signal Ad is smaller than the command signal Ac, and changes to "H" when the current detected signal Ad becomes larger than the command signal Ac. The basic PWM pulse signal Wp is "L" in the predetermined period Tf after the compare signal Ap becomes "H." When the basic PWM pulse signal Wp becomes "L," the activation by the low-side power transistors is stopped, the current detected signal Ad becomes zero, and the compare signal Ap becomes "L." When the predetermined time Tf has passed, the basic PWM pulse signal Wp becomes "H," and the activation to the windings by the low-side power transistors is resumed. In this way, the basic PWM pulse signal Wp becomes a PWM signal (pulse width modulation signal) responding with the result of the comparison between the current detected signal Ad and the command signal Ac.

Figure 16:
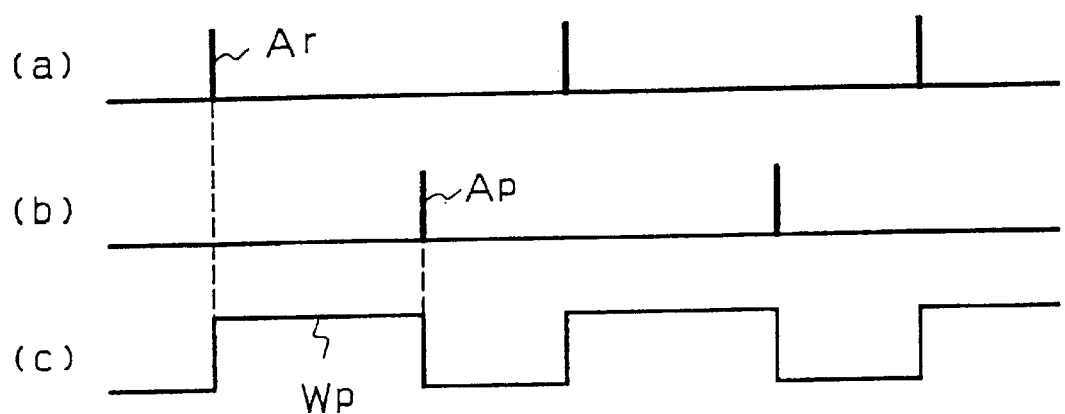
FIG. 16 is a waveform diagram illustrating the operation of the compare pulse part shown in FIG. 11 in accordance with the embodiment 1.

FIG. 11 shows another configuration of the compare pulse part. The compare pulse part of FIG. 11 comprises a compare circuit 521, a reference pulse circuit 522 and a basic PWM pulse circuit 523. The compare circuit 521 compares the current detected signal Ad with the command signal Ac. When the current detected signal Ad becomes larger than the command signal Ac, the compare signal Ap is changed to "H." The reference pulse circuit 522 outputs a reference pulse signal Ar at predetermined time intervals. The basic PWM pulse circuit 523 comprises a flip-flop for example, and sets its internal state to "H" at the rising edge of the reference pulse signal Ar, thereby setting the basic PWM pulse signal Wp to "H." The basic PWM pulse circuit 523 sets its internal state to "L" at the rising edge of the compare signal Ap, thereby setting the basic PWM pulse signal Wp to "L." Parts (a) to (c) in FIG. 16 show the relationship among the reference pulse signal Ar, the compare signal Ap and the basic PWM pulse signal Wp. The abscissa of FIG. 16 represents time. The basic PWM pulse signal Wp becomes "H" responding with the arrival of the pulses of the reference pulse signal Ar, and the basic PWM pulse signal Wp becomes "L" at the rising edge of the compare signal Ap. In this way, the basis PWM pulse signal Wp becomes a PWM signal responding with the result of the comparison between the current detected signal Ad and the command signal Ac. Furthermore, in the period wherein the reference pulse signal Ar is "H," the basic PWM pulse signal Wp can be forcibly set to "L." As a result, the basic PWM pulse signal Wp becomes a switching signal changing securely with a PWM frequency responding with the frequency of the reference pulse signal Ar.

Figure 12:
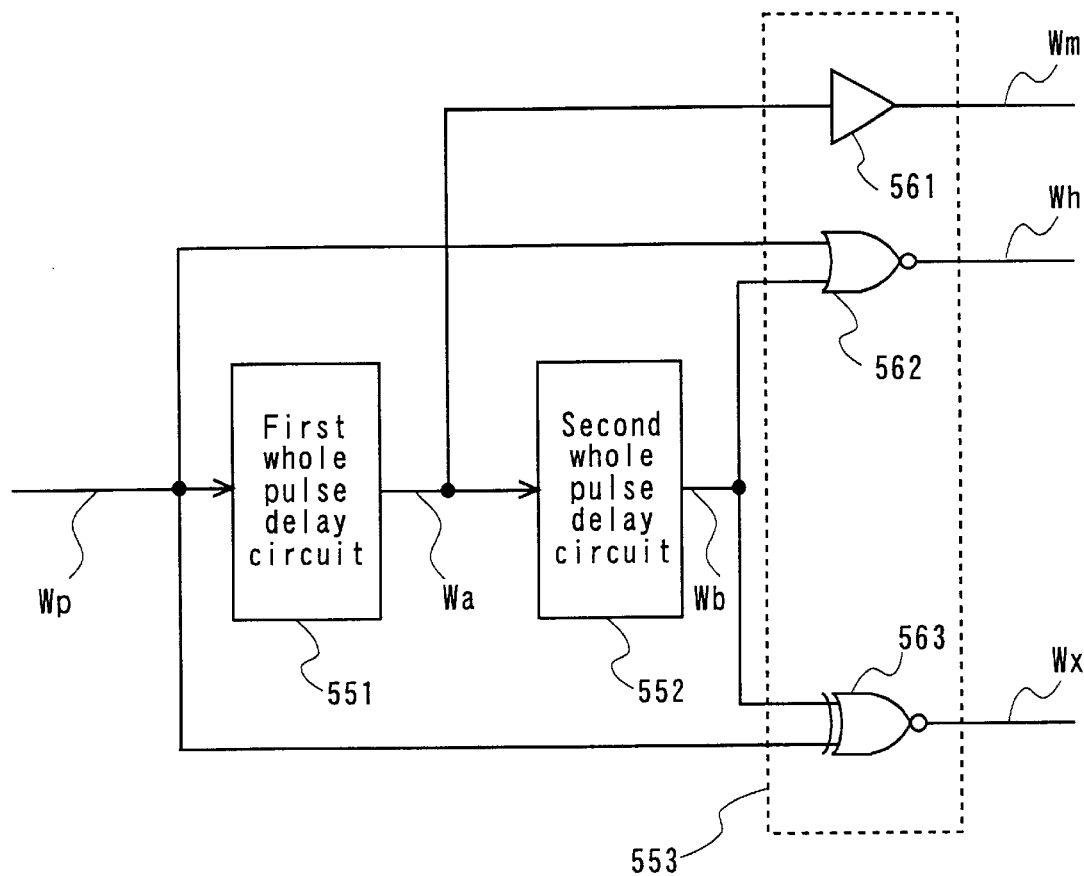
FIG. 12 is a circuit diagram of the PWM pulse part 502 of the switching control part 22 in accordance with the embodiment 1.

The PWM pulse part shown in FIG. 12 comprises a first whole pulse delay circuit 551, a second whole pulse delay circuit 552 and a logic composing output circuit 553. The first-whole pulse delay circuit 551 produces a first whole pulse delay signal Wa by delaying the basic PWM pulse signal Wp of the compare pulse part 501 by substantially a first predetermined time Ta.

The second whole pulse delay circuit 552 produces a second whole pulse delay signal Wb by delaying the first whole pulse delay signal Wa by substantially a second predetermined time Tb. The logic composing output circuit 553 composes logically the basic PWM pulse signal Wp, the first whole pulse delay signal Wa and the second whole pulse delay signal Wb, and outputs the main PWM pulse signal Wm, the auxiliary PWM pulse signal Wh and the noise eliminating signal Wx.

Figure 17:
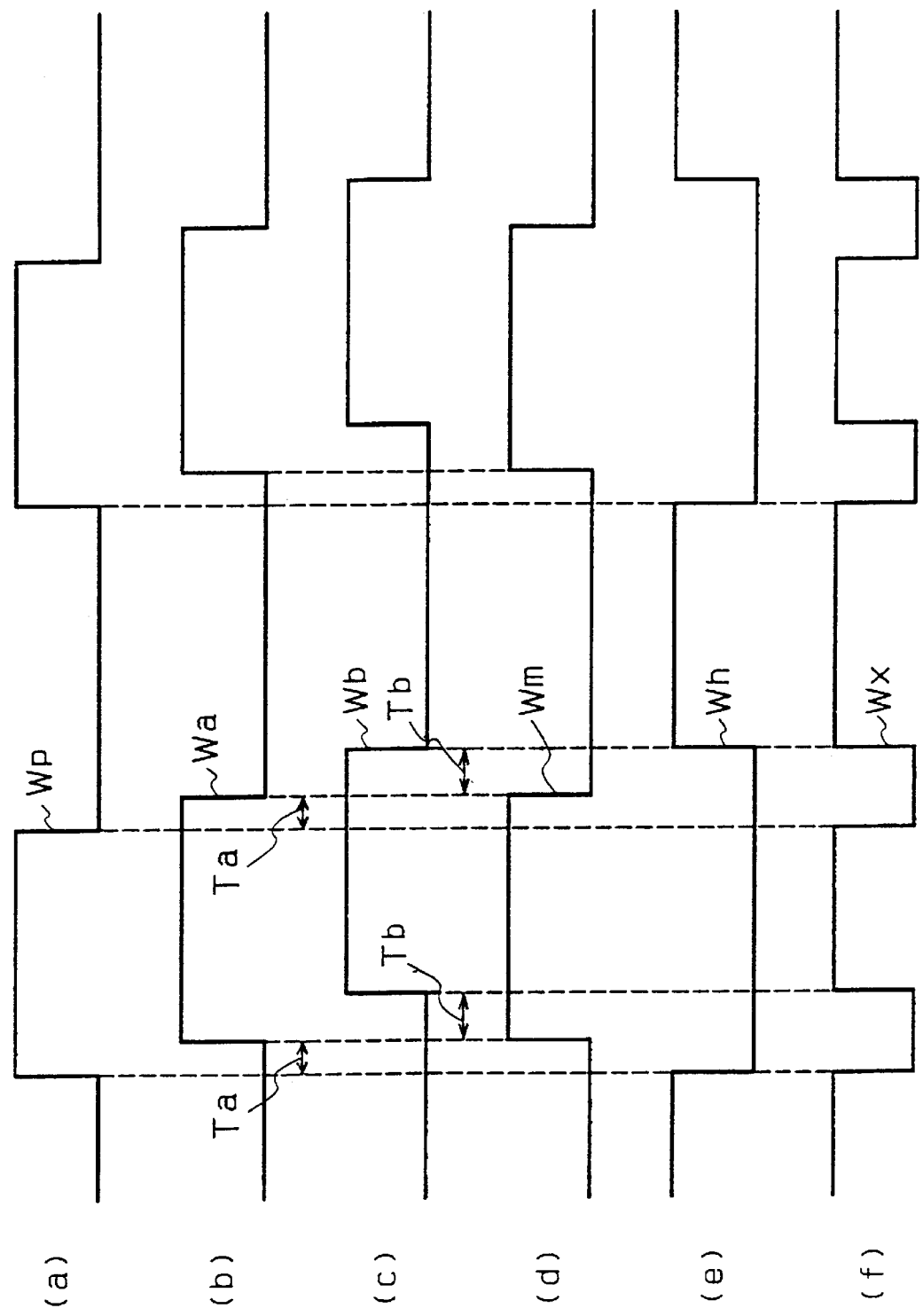
FIG. 17 is a waveform diagram illustrating the operation of the PWM pulse part shown in FIG. 12 in accordance with the embodiment 1.

Parts (a) to (f) in FIG. 17 show the relationship among the basic PWM pulse signal Wp, the first whole pulse delay signal Wa, the second whole pulse delay signal Wb, the main PWM pulse signal Wm, the auxiliary PWM pulse signal Wh and the noise eliminating signal Wx. The abscissa of FIG. 17 represents time. The first whole pulse delay signal Wa is a signal obtained by delaying wholly the basic PWM pulse signal Wp by the first predetermined time Ta. The second whole pulse delay signal Wb is a signal obtained by delaying wholly the first whole pulse delay signal Wa by the second predetermined time Tb (see the part (a) to (c) in FIG. 17). Since the main PWM pulse signal Wm is a signal obtained by outputting the first whole pulse delay signal Wa via a buffer circuit 561, the waveform of the main PWM pulse signal Wm is the same as that of the first whole pulse delay signal Wa (see the parts (b) and (d) in FIG. 17). The auxiliary PWM pulse signal Wh is obtained by composing logically the basic PWM pulse signal Wp and the second whole pulse delay signal Wb with a NOR circuit 562, and has the waveform shown in the part (e) of FIG. 17. In addition, the "H" period of the auxiliary PWM pulse signal Wh is within the "L" period of the main PWM pulse signal Wm. Therefore, the main PWM pulse signal Wm and the auxiliary PWM pulse signal Wh do not become "H" simultaneously. In other words, a time difference equal to the first predetermined time Ta or the second predetermined time Tb is provided between the "H" period of the auxiliary PWM pulse signal Wh and the "H" period of the main PWM pulse signal Wm. The noise eliminating signal Wx is obtained by composing logically the basic PWM pulse signal Wp and the second whole pulse delay signal Wb with an exclusive NOR circuit 563, and has the waveform shown in the part (f) of FIG. 17. The "L" period of the noise eliminating signal Wx includes the changing timing or the changing moment of the main PWM pulse signal Wm, and has at least the predetermined time Tb from the changing timing. This noise eliminating signal Wx is input to the noise eliminating circuit 201 of the detected pulse producing part 42 of the voltage detecting part 30. Noises, occurring on the comparison detected signals of the winding terminal voltages in accordance with the high-frequency switching operations of the power transistors, are eliminated with the noise eliminating signal Wx. Besides, the noise eliminating signal Wx can be produced by composing logically the main PWM pulse signal Wm and the second whole pulse delay signal Wb with an exclusive NOR circuit. In this case, the "L" period of the noise eliminating signal Wx includes substantially the changing timing from OFF to ON and the changing timing from ON to OFF of the high-frequency switching operation of the power transistor. In other words, the noise eliminating signal Wx is produced in response to the basic PWM pulse signal Wp, and becomes "L" in a predetermined period including the changing timing of the high-frequency switching operation of the power transistor. The time ratio wherein the noise eliminating signal Wx becomes "L" is about 20% (less than 50%). Therefore, the time for detecting the terminal voltages of the windings is much longer than the time for eliminating noise (the time for not detecting the terminal voltages).

The operation and advantages of the embodiment 1 will be described below. In response to the first state signals P1 to P6 and the second state signals Q1 to Q6 of the state shifting part 31, the activation control part 32 outputs the low-side activation control signals M1 to M3 and the high-side activation control signals N1 to N3 to select windings to be activated. The power supplying part 20 turns ON and OFF the low-side power transistors 101, 102 and 103 and the high-side power transistors 105, 106 and 107 in response to the low-side activation control signals M1 to M3 and the high-side activation control signals N1 to N3, respectively. As a result, the power supplying part 20 supplies power to the three-phase windings 12, 13 and 14.

The switching control part 22 and the current detecting part 21 form a switching operation block, and the switching operation block operates to supply PWM pulse-like drive voltages V1, V2 and V3 to the three-phase windings 12, 13 and 14, respectively. In response to the main PWM pulse signal Wm of the switching control part 22, the low-side activation control signals M1, M2 and M3 of the activation control part 32 become PWM pulse signals. One or two of the low-side power transistors 101, 102 and 103 of the power supplying part 20, which are selected by the low-side activation control signals M1, M2 and M3 of the activation control part 32, perform ON-OFF high-frequency switching operation simultaneously. The power supplying part 20 thus supplies the negative parts of the drive current signals I1, I2 and I3 to the windings 12, 13 and 14, respectively. When the low-side power transistors 101, 102 and 103 of the power supplying part 20 turn OFF, one or two of the high-side power diodes 105d, 106d and 107d turn ON by the inductive reaction of the windings, thereby continuously supplying the negative parts of the drive currents I1, I2 and I3 to the windings 12, 13 and 14. As a result, the drive voltages V1, V2 and V3 to the three-phase windings 12, 13 and 14 become PWM voltages. This significantly reduces the power loses of the low-side power transistors 101, 102 and 103 of the power supplying part 20.

The high-side power transistors 105, 106 and 107 of the power supplying part 20 supply the positive parts of the drive current signals I1, I2 and I3 to the three-phase windings 12, 13 and 14. First, the case wherein the high-side auxiliary signal Wj of the activation control part 32 is fixed at "L" will be described below. This corresponds to the case wherein the switch circuit 461 of the auxiliary selecting circuit 406 is connected to the Sb side. In this case, one or two of the high-side power transistors 105, 106 and 107 of the power supplying part 20, which are selected by the high-side activation control signals N1, N2 and N3 of the activation control part 32, turn ON simultaneously (do not perform PWM operation). The power supplying part 20 thus supplies the positive parts of the drive current signals I1, I2 and I3 to the windings 12, 13 and 14, respectively. As a result, in accordance with the rotation of the rotor 11, the drive current signals I1, I2 and I3, alternating in the positive and negative directions, are supplied to the three-phase windings 12, 13 and 14, respectively. In addition, this significantly reduces the power loses of the high-side power transistors 105, 106 and 107 of the power supplying part 20.

The case wherein the high-side auxiliary signal Wj of the activation control part 32 coincides with the auxiliary PWM pulse signal Wh of the switching control part 22 will be described below. This corresponds to the case wherein the switch circuit 461 of the auxiliary selecting circuit 406 is connected to the Sa side. The auxiliary PWM pulse signal Wh is a PWM signal turning OFF/ON complementarily to the ON-OFF PWM of the main PWM pulse signal Wm. Each of the high-side activation control signals N1, N2 and N3 of the activation control part 32 includes a PWM pulse signal responding with the auxiliary PWM pulse signal Wh. In the period during which one of the above-mentioned high-side power diodes turns ON, each of the high-side activation control signals N1, N2 and N3 activates the high-side power transistor having the same phase. In other words, the high-side power transistor having the same phase with the low-side power transistor performing ON-OFF high-frequency switching operation is controlled so as to perform OFF-ON high-frequency switching operation complementarily to the ON-OFF high-frequency switching operation of the low-side power transistor. As a result, power loses caused by the high-side power diodes can be reduced, whereby power loses and heat generation can thus be reduced further. Since the auxiliary PWM pulse signal Wh is auxiliary, its function can be eliminated (by connecting the switch 461 to the Sb side) as described above.

The current detecting part 21 detects an activation current or supply current Ig supplied from the voltage supplying part 25 to the windings 12, 13 and 14 via the three low-side power transistors 101, 102 and 103 of the power supplying part 20, and outputs the current detected signal Ad. The supply current Ig corresponds to the composite value of the negative parts of the three-phase drive current signals I1, I2 and I3 to the three-phase windings 12, 13 and 14. The switching control part 22 compares the current detected signal Ad with the command signal Ac, and outputs the main PWM pulse signal Wm and the auxiliary PWM pulse signal Wh responding with the comparison result. The low-side power transistors 101, 102 and 103 of the power supplying part 20 perform ON-OFF high-frequency switching operation in response to the main PWM pulse signal Wm. The drive voltages (terminal voltages) V1, V2 and V3 to the windings 12, 13 and 14 are converted into PWM voltages. As a result, the supply current Ig is controlled in response to the command signal Ac by the high-frequency switching operation of the low-side power transistors responding with the main PWM pulse signal (a switching pulse signal). Consequently, the drive current signals I1, I2 and I3 supplied to the three-phase windings 12, 13 and 14 can be controlled accurately in response to the command signal Ac, and the pulsation of the generated drive force can be reduced remarkably. In other words, the vibration and the acoustic noise can be reduced significantly.

In addition, the low-side power transistors of the power supplying part 20 perform ON-OFF high-frequency switching operation simultaneously in response to the main PWM pulse signal Wm (a single switching pulse signal) from the switching control part 22, which is very simple configuration. Furthermore, in the case when the high-side auxiliary signal Wj is fixed at "L," the high-side power transistors of the power supplying part 20 do not perform PWM operation but perform only ON-OFF operation. Therefore, the ON-OFF operation of the high-side power transistors can be carried out very easily.

Moreover, even when the high-side power transistors of the power supplying part 20 are activated to perform ON-OFF high-frequency switching operation in response to the auxiliary PWM pulse signal Wh, a gap time can be provided easily between the main PWM pulse signal Wm and the auxiliary PWM pulse signal Wh, because these switching pulse signals Wm and Wh are produced responding with the basic PWM pulse signal (a single switching pulse signal). As a result, the low-side power transistor and the high-side power transistor, having the same phase, can be easily prevented from becoming ON simultaneously.

The voltage comparing part 41 of the voltage detecting part 30 compares directly the three-phase terminal voltages V1, V2 and V3 with the common terminal voltage Vc substantially. The select command circuit outputs the select command signal in response to the first state signals P1 to P6 and/or the second state signals Q1 to Q6 of the state shifting part 31. The comparison result of the terminal voltages selected by the select command signal is output as the selective voltage compared signal Bj. As a result, the winding terminal voltage corresponding to the holding state of the state shifting part 31 can be selected, detected and compared easily. In other words, it is possible to select the terminal voltages of the winding 12, 13 and 14 detected and compared in accordance with the rotation of the disk 1 and the rotor 11. It is also possible to obtain the selective voltage compared signal Bj directly responding with the comparison result of the selected and detected terminal voltages.

In the noise eliminating circuit 201 of the detected pulse producing part 42 of the voltage detecting part 30, the selective voltage compared signal Bj of the voltage comparing part 41 is logically gated with the noise eliminating signal Wx. The noise eliminating circuit 201 thus produces an output signal Ca free from an influence of a PWM noise included in the selective voltage compared signal Bj. In other words, the noise eliminating signal Wx of the switching control part 22 is held at "L" in a predetermined time including a changing timing of the main PWM pulse signal Wm. Therefore, a PWM noise in the selective voltage compared signal Bj is eliminated by gating the selective voltage compared signal Bj with the noise eliminating signal Wx. As a result, the output signal Ca of the noise eliminating circuit 201 becomes an accurate signal responding directly with the comparison result of the winding terminal voltages. In particular, since the power transistors of the power supplying part 20 perform high-frequency switching operation in response to the main PWM pulse signal Wm used as a single switching pulse signal, it is possible to produce easily the noise eliminating signal Wx for eliminating effectively the influence of the PWM noise.

The pulse producing circuit 202 of the detected pulse producing part 42 changes the state of the detected pulse signal Dt to "H" at the rising edge of the output signal Ca from the noise eliminating circuit 201. The detected pulse signal Dt is reset to "L" by the third timing adjust signal F3 produced after the third adjust time T3 from the foregoing rising edge of the detected pulse signal Dt. Therefore, even if the rising edges of the output signal Ca from the noise eliminating circuit 201 are generated two or more times by mistake because of chatters included in the comparison result of the terminal voltages for example, the detected pulse signal Dt of the pulse producing circuit 202 changes only once. Therefore, the command signal Ac of the command part 35 using the detected pulse signal Dt is prevented from malfunctioning. Furthermore, the state shifting part 31 using the detected pulse signal Dt is also prevented from malfunctioning.

The timing adjust part 43 of the state shifting part 31 detects the arrival of the rising edge of the detected pulse signal Dt, and the first counter circuit 303 measures the time interval T0 between successive two detection edges of the detected pulse signal Dt. The second counter circuit 304 outputs the first timing adjust signal F1 delayed from the detection edge of the detected pulse signal Dt by the first adjust time T1 responding with the time interval T0. In addition, the second counter circuit 304 and the third counter circuit 305 output the second timing adjust signal F2 delayed from the detection edge of the detected pulse signal Dt by the second adjust time T2 responding with the time interval T0. Furthermore, the delayed pulse generating circuit 310 outputs the third timing adjust signal F3 delayed from the detection edge of the detected pulse signal Dt by the third adjust time T3 responding with the time interval T0 (see FIG. 13). It is herein assumed that the relationship of T1<T2<T3<T0 is established.

The state shifting part 31 shifts the holding state from a first state to a second state in response to the first timing adjust signal F1, and changes the first state signals P1 to P6 of the first state holding circuit 320. In addition, the state shifting part 31 further shifts the holding state from the second state to a third state in response to the second timing adjust signal F2, and changes the second state signals Q1 to Q6 of the second state holding circuit 330. The first state signals P1 to P6 are shifted in sequence at every arrival of the first timing adjust signal F1, and the second state signals Q1 to Q6 are also shifted in sequence at every arrival of the second timing adjust signal F2 (see FIG. 14).

The first selecting circuit 401 and the second selecting circuit 402 of the activation control part 32 produce the first select signals Mm1, Mm2 and Mm3 and the second select signals Nn1, Nn2 and Nn3 in response to the holding state (the first state signals P1 to P6 and the second state signals Q1 to Q6) of the state shifting part 31. The first select signals Mm1, Mm2 and Mm3 determine the active periods of the low-side power transistors 101, 102 and 103 of the power supplying part 20, respectively. The second select signals Nn1, Nn2 and Nn3 determine the active periods of the high-side power transistors 105, 106 and 107 of the power supplying part 20, respectively. The activation control part 32 produces the low-side activation control signal M1, M2 and M3 by composing logically the first select signals Mm1, Mm2 and Mm3 and the main PWM pulse signal Wm of the switching control part 22. The low-side power transistors 101, 102 and 103 of the power supplying part 20 are subjected to ON-OFF PWM switching operation responding with the low-side activation control signal M1, M2 and M3, respectively. Therefore, power loses and heat generation at the low-side power transistors can be reduced significantly.

In the case when the switch circuit 461 of the auxiliary selecting circuit 406 is connected to the Sb side, the high-side auxiliary signal Wj becomes "L," and the auxiliary activation control signals Mm5, Mm6 and Mm7 also become "L." Therefore, the activation control part 32 produces the high-side activation control signals N1, N2 and N3 coincident with the second select signal Nn1, Nn2 and Nn3, and turns ON/OFF the high-side power transistors 105, 106 and 107 of the power supplying part 20 (high-frequency switching operation is not performed). Therefore, power loses and heat generation at the high-side power transistors can be reduced significantly.

Furthermore, in the case when the switch circuit 461 of the auxiliary selecting circuit 406 is connected to the Sa side, the high-side auxiliary signal Wj becomes coincident with the auxiliary PWM pulse signal Wh. The auxiliary activation control signal Mm5, Mm6 and Mm7 are produced by composing the auxiliary PWM pulse signal Wh and the first select signals Mm1, Mm2 and Mm3. The third pulse composing circuit 405 of the activation control part 32 composes logically the second select signals Nn1, Nn2 and Nn3 and the auxiliary activation control signals Mm5, Mm6 and Mm7, and produces the high-side activation control signal N1, N2 and N3, respectively. In the periods corresponding to the second select signals Nn1, Nn2 and Nn3, the high-side power transistors 105, 106 and 107 are turned ON/OFF (high-frequency switching operation is not performed). In the periods corresponding to the first select signals Mm1, Mm2 and Mm3, the high-side power transistors 105, 106 and 107 are performed high-frequency ON-OFF switching operation in response to the auxiliary PWM pulse signal Wh. As a result, power loses and heat generation at the high-side power transistors 105, 106 and 107 and the high-side power diodes 105d, 106d and 107d can be reduced significantly.

In the present embodiment, as understood through the above-mentioned descriptions, position detecting elements are made unnecessary by detecting the terminal voltages of the windings so as to control current paths to the windings. In addition, high-frequency switching operation is performed to turn ON/OFF the power transistors for supplying drive currents to the windings in both directions, thereby reducing power loses significantly. In other words, high-frequency switching operation is performed to fully turn ON/OFF the low-side power transistors, and the high-side power transistors are fully turned ON/OFF to alternate current paths, thereby reducing the power loses of the power transistors and the power diodes significantly. As a result, heat generation in the motor and the disk drive apparatus can be reduced greatly, and the disk drive apparatus can stably record and/or reproduce on/from a recordable disk.

In addition, in the embodiment, the state shifting part shifts the holding state from a first state to a second state after a first adjust time T1 from detection of the detected pulse signal, and further shifts the holding state from the second state to a third state after a second adjust time T2 (the second adjust time T2>the first adjust time T1) from detection of the detected pulse signal. The activation control part produces three-phase low-side activation control signals and three-phase high-side activation control signals responding with the holding state of the state shifting part for controlling the active periods of the three low-side power transistors and the three high-side power transistors. With this configuration, each of the active periods of the three low-side power transistors and the three high-side power transistors is made larger than an electrical angle of 360/3=120 degrees. Furthermore, the switching operation block controls the supply current to the three-phase windings from the voltage supplying part in correspondence with the command signal by making high-frequency switching operation of at least one power transistor among the three low-side power transistors and the three high-side power transistors. With this configuration, two power transistors among the three low-side power transistors or the three high-side power transistors are activated simultaneously in each alteration of current paths while the at least one power transistor performs the high-frequency switching operation so as to control the supply current responding with the command signal. Therefore, the supply current to the three-phase windings is precisely controlled responding with the command signal even when the two power transistors are activated simultaneously, and the pulsation of the generated drive force can be reduced. Furthermore, the alteration of current paths is thus smoothened by the simultaneous activation of the two power transistors, the pulsation of the generated drive force can further be reduced remarkably. As a result, an excellent motor and/or an excellent disk drive apparatus without a position detecting element can be realized, which reduces the power consumption, the disk vibration and the acoustic noise.

The switching operation block can be configured so as to include the current detecting part for producing the current detected signal responding with the supply current to the three-phase windings from the voltage supplying part, and the switching control part for comparing the output signal of the current detecting part with the command signal and producing a switching pulse signal responding with the comparison result, thereby making high-frequency switching operation of at least one power transistor among the three low-side power transistors and the three high-side power transistors responding with the switching pulse signal. With this configuration, it is easy to control the supply current to the three-phase windings responding with the command signal even when the two power transistors among the three low-side power transistors or the three high-side power transistors are activated simultaneously in an alteration of current paths.

The state shifting part is configured so as to change the first adjust time T1 and the second adjust time T2 in response to an interval T0 of the detected pulse signal. With this configuration, each of the active periods of the three low-side power transistors and the three high-side power transistors is easily made larger than 360/3=120 degrees even if the rotational speed of the disk or the rotor changes widely. The active periods of the high-side power transistors and the low-side power transistors are herein set to about 140 degrees (130 to 150 degrees). The active period can be made larger in the range of 125 to 180 degrees in order to reduce the disk vibration and the acoustic noise.

Furthermore, one or two of the three low-side power transistors perform successively high-frequency ON-OFF switching operation in accordance with the rotational position of the rotor, thereby attaining successively a first switching operation wherein a winding terminal voltage for one phase is subjected to high-frequency switching and a second switching operation wherein winding terminal voltages for two phases are subjected to high-frequency switching. The first switching operation and the second switching operation are performed alternatively corresponding to the rotation of the rotor.

Furthermore, in the present embodiment, the detection of the detected pulse signal is stopped during the first stop period including the changing timing (or the changing moment) from OFF to ON of the power transistor performing high-frequency switching operation and during the second stop period including the changing timing (or the changing moment) from ON to OFF of the power transistor. The detection of the detected pulse signal in response to the comparison result of the winding terminal voltages is performed during the time excluding the first stop period and second stop period. As a result, it is possible to prevent easily an improper detection and an improper operation because of a PWM noise caused by the PWM switching operation of the power transistors.

Generally, in the case when at least one power transistor is subjected to high-frequency switching operation responding with a switching pulse signal, the detection of the detected pulse signal should be stopped during at least one of the first stop period including the changing timing from OFF to ON and the second stop period including the changing timing from ON to OFF of the power transistor. Furthermore, the detection of the detected pulse signal in response to the comparison result of the winding terminal voltages during at least the ON period of the power transistor excluding at least one of the first stop period and the second stop period should be carried out to obtain the above-mentioned effect. In particular, since the power transistor/transistors is/are subjected to the high-frequency switching operation in response to a single switching pulse signal, the number of occurrences of switching changing moments of the power transistor/transistors are reduced in comparison with that occurred in a conventional case using three-phase switching pulse signals. As a result, an improper operation caused by a PWM noise owing to the PWM switching operation can be prevented easily. In addition, since the detection of the detected pulse signal responding with the comparison result of the winding terminal voltages is carried out during a relatively long period excluding the first stop period and/or the second stop period, the zero cross timing (or the zero cross moment) of the terminal voltage can be detected accurately.

Furthermore, since the winding terminal voltages are not smoothened with filters (comprising resistors and capacitors), it is possible to produce the detected pulse signal promptly responding with the change in the terminal voltage. The zero cross timing herein means a moment when the terminal voltage becomes substantially equal to the common voltage. As a result, by changing current paths to the windings in response to the detected pulse signal, the rotor and the disk can be rotated accurately. Moreover, in the case when the speed control for the disk or the rotor can be performed with the command signal which is responding with the output pulse signal such as the detected pulse signal Dt of the voltage detecting part, its rotational speed can be controlled accurately with a small jitter. In other words, it is possible to realize an excellent disk drive apparatus capable of driving and controlling the disk accurately.

Furthermore, the voltage detecting part comprises the voltage comparing part for comparing the winding terminal voltages and the detected pulse producing part including a noise eliminating circuit. The noise eliminating circuit gates logically the selective voltage compared signal of the voltage comparing part with the noise eliminating signal responding with the main PWM pulse signal used as a switching pulse signal. Therefore, the selective voltage compared signal of the voltage comparing part is made invalid at the first predetermined time including the changing timing from OFF to ON and the second predetermined time including the changing timing from ON to OFF of the switching pulse signal. As a result, an improper detection caused by a PWM noise owing to the PWM switching operation can be prevented easily.

Generally, the noise eliminating circuit gates logically the selective voltage compared signal of the voltage comparing part with the noise eliminating signal which is responding with the main PWM pulse signal used as a switching pulse signal. In addition, the circuit makes the selective voltage compared signal of the voltage comparing part invalid during at least one of the first predetermined time including the changing timing from OFF to ON and the second predetermined time including the changing timing from ON to OFF of the switching pulse signal. As a result, an improper detection caused by a PWM noise owing to the PWM switching operation of the power transistors can be prevented easily. In particular, since the power transistors are subjected to the high-frequency switching operation in response to a single switching pulse signal, the noise eliminating signal can be produced with a simple circuit. The time ratio wherein the noise eliminating signal Wx becomes "L" is about 20% (less than 50%). Therefore, the time for detecting the winding terminal voltages is much longer than the time for noise elimination. For this reason, it is possible to obtain the detected pulse signal responding directly and accurately with the comparison result of the winding terminal voltages. The disk or the rotor can thus be rotated accurately.

Furthermore, the voltage detecting part includes the pulse generating circuit. The state of the flip-flop of the pulse generating circuit is changed in response to the generation of the rising edge of the output signal of noise eliminating means, thereby producing the detected pulse signal responding with the state of the flip-flop. This prevents the detected pulse signal from generating excessively, and the activation control operation is stabilized. In other words, the disk or the rotor is rotated stably. The flip-flop is reset by the third timing adjust signal after the third adjust time T3 from the detecting edge of the detected pulse signal responding with the change of the state of the flip-flop. The third adjust time T3 changes in response to the interval T0 of the detected pulse signal. Therefore, even if the rotational speed of the disk or the rotor changes widely, it is possible to prevent the detected signal from generating excessively.

Furthermore, in the case of the present embodiment, in response to the ON-OFF high-frequency switching operation of the low-side power transistor, the high-side power transistor in the same phase with the low-side power transistor is subjected to the OFF-ON high-frequency switching operation complementarily. This reduces power loss due to the high-side power diode. In addition, the ON voltage of the high-side power diode changes depending on current, and sometimes affects badly the detection of the winding terminal voltages. Since the high-side power transistor is complementarily subjected to OFF-ON high-frequency switching operation, the ON voltage of the high-side power diode affects hardly the detection of the winding terminal voltages. This makes it possible to carry out accurate detection of the terminal voltages. Furthermore, in order to prevent the low-side power transistor and the high-side power transistor from turning ON simultaneously, a gap period is provided between their operations. The effect of the ON voltage of the high-side diode occurs during this gap period. Therefore, the detection of the winding terminal voltage is stopped during the gap period by using the noise eliminating signal Wx. In addition, since these operations are performed in response to a single switching pulse signal, these operations can be realized with a very simple circuit configuration. In the present embodiment, one or two of the high-side power transistors are simultaneously subjected to OFF-ON high-frequency switching operation complementarily corresponding to ON-OFF high-frequency switching operation of one or two of the low-side power transistors. However, without being limited to such a case, only one of the high-side power transistors may be subjected to complementary OFF-ON high-frequency switching operation.

In the case when the high-side auxiliary signal Wj in accordance with the present embodiment is fixed at the "L" state, the high-side diode turns ON when the low-side power transistor turns OFF. In detecting the winding terminal voltages by the voltage detecting part 30, an improper detection may occur because of the effect of the ON voltage of the high-side diode. In order to prevent the improper detection of the winding terminal voltages during the ON period of the high-side diode, the noise eliminating signal Wx may be modified so that the detection of the winding terminal voltages is carried out only during the ON period of the low-side power transistor in ON-OFF high-frequency switching operation. By substituting the configuration of the PWM pulse part shown in FIG. 18 for the PWM pulse part of the switching control part 22 shown in FIG. 12, it is possible to realize the above-mentioned operation. This configuration will be described below.

Figure 18:
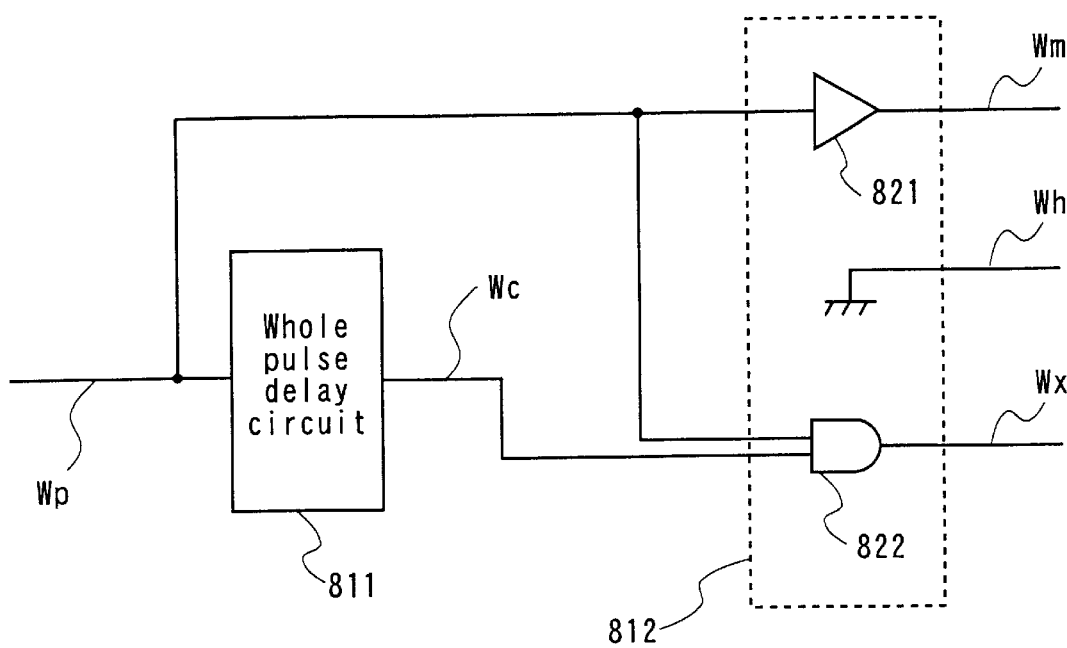
FIG. 18 is a circuit diagram of another PWM pulse part 502 of the switching control part 22 in accordance with the embodiment 1.

The PWM pulse part of the switching control part 22 shown in FIG. 18 comprises a whole pulse delay part 811 and a logic composing output circuit 812. The whole pulse delay part 811 outputs a whole delay pulse signal Wc obtained by delaying wholly the basic PWM pulse signal Wp of the compare pulse part by a predetermined time Tc or about Tc. The logic composing output circuit 812 composes logically the basic PWM pulse signal Wp and the whole delay pulse signal Wc, and outputs the main PWM pulse signal Wm, the auxiliary PWM pulse signal Wh and the noise eliminating signal Wx. Parts (a) to (e) in FIG. 19 show the relationship among the basic PWM pulse signal Wp, the whole delay pulse signal Wc, the main PWM pulse signal Wm, the auxiliary PWM pulse signal Wh and the noise eliminating signal Wx. The abscissa of FIG. 19 represents time. The whole delay pulse signal Wc is a signal delayed wholly the basic PWM pulse signal Wp by the predetermined time Tc (see the parts (a) and (b) in FIG. 19). Since the main PWM pulse signal Wm is obtained by outputting the basic PWM pulse signal Wp via a buffer circuit 821, its waveform is the same as that of the basic PWM pulse signal Wp (see the part (c) in FIG. 19). The auxiliary PWM pulse signal Wh is fixed to the "L" state (see the part (d) in FIG. 19). The noise eliminating signal Wx is obtained by composing logically the basic PWM pulse signal Wp and the whole delay pulse signal Wc with an AND circuit 822, and has the waveform shown in the part (e) of FIG. 19. As a result, the "L" period of the noise eliminating signal Wx includes the "L" period of the main PWM pulse signal Wm, and has the predetermined time width Tc from the changing timing from "L" to "H" of the main PWM pulse signal Wm.

By forming the PWM pulse part of the switching control part 22 as shown in FIG. 18, the low-side power transistors perform ON-OFF high-frequency switching operation in response to the main PWM pulse signal Wm. Since the auxiliary PWM pulse signal Wh is "L," the high-side power transistors do not perform high-frequency switching operation. In the period during which the noise eliminating signal Wx is "L," the voltage detecting part 30 stops the detection of the winding terminal voltages. Therefore, the voltage detecting part 30 stops the detection of the winding terminal voltages during the predetermined time Tc including the changing timing from OFF to ON of the power transistor. When the power transistor turns ON after the passage of the predetermined time Tc, the voltage detecting part 30 performs the detection of the detected pulse signal directly responding with the comparison result of the winding terminal voltages. This can prevent an improper detection and an improper operation caused by a PWM noise owing to the PWM switching operation of the power transistor.

In addition, the PWM pulse part of the switching control part 22 shown in FIG. 12 can be substituted by the configuration shown in FIG. 20. This configuration will be described below.

Figure 21:
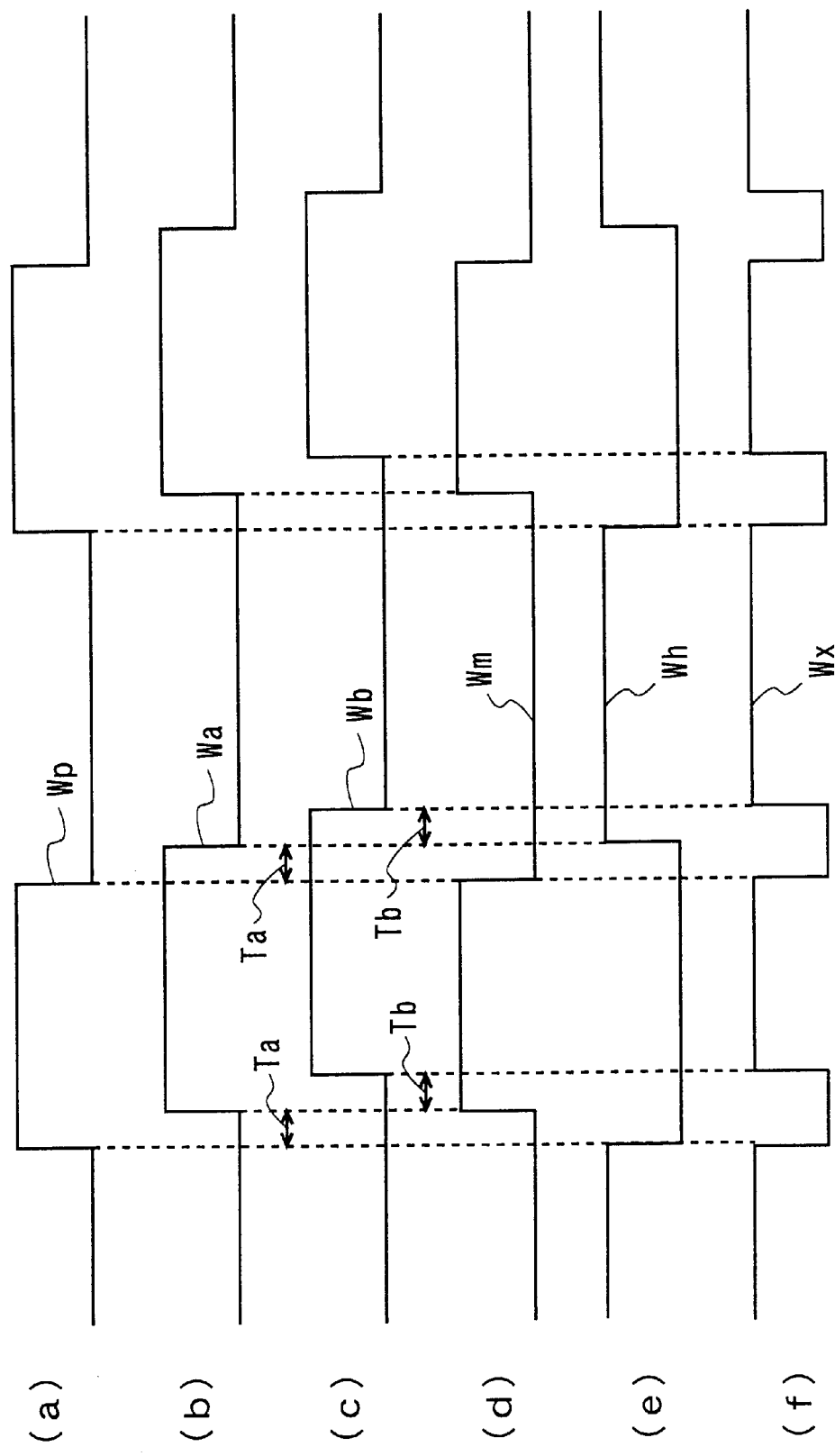
FIG. 21 is a waveform diagram illustrating the operation of the PWM pulse part shown in FIG. 20 in accordance with the embodiment 1.

The switching control part 22 shown in FIG. 20 comprises a first whole pulse delay circuit 851, a second whole pulse delay circuit 852 and a logic composing output circuit 853. The first whole pulse delay circuit 851 outputs the first whole delay pulse signal Wa obtained by delaying wholly the basic PWM pulse signal Wp of the compare pulse part 501 by the first predetermined time Ta or about Ta. The second whole pulse delay circuit 852 outputs the second whole delay pulse signal Wb obtained by delaying wholly the first delay pulse signal Wa by the second predetermined time Tb or about Tb. The logic composing output circuit 853 composes logically the basic PWM pulse signal Wp, the first whole delay pulse signal Wa and the second whole delay pulse signal Wb, and outputs the main PWM pulse signal Wm, the auxiliary PWM pulse signal Wh and the noise eliminating signal Wx. Parts (a) to (f) in FIG. 21 show the relationship among the basic PWM pulse signal Wp, the first whole delay pulse signal Wa, the second whole delay pulse signal Wb, the main PWM pulse signal Wm, the auxiliary PWM pulse signal Wh and the noise eliminating signal Wx. The abscissa of FIG. 21 represents time. The first whole delay pulse signal Wa is a signal delayed wholly the basic PWM pulse signal Wp by the first predetermined time Ta. The second whole delay pulse signal Wb is a signal delayed wholly the first whole delay pulse signal Wa by the second predetermined time Tb (see the parts (a) to (c) in FIG. 21). The main PWM pulse signal Wm is produced by composing the basic PWM pulse signal Wp and the first delay pulse signal Wa with an AND circuit 861, and has the waveform shown in the part (d) of FIG. 21. The auxiliary PWM pulse signal Wh is produced by composing logically the basic PWM pulse signal Wp and the first whole delay pulse signal Wa with a NOR circuit 862, and has the waveform shown in the part (e) of FIG. 21. Furthermore, the "H" period of the auxiliary PWM pulse signal Wh is within the "L" period of the main PWM pulse signal Wm. Therefore, the main PWM pulse signal Wm and the auxiliary PWM pulse signal Wh do not become "H" simultaneously. In other words, the first predetermined time Ta is provided as the time difference between the "H" period of the auxiliary PWM pulse signal Wh and the "H" period of the main PWM pulse signal Wm. The noise eliminating signal Wx is produced by composing logically the basic PWM pulse signal Wp and the second whole delay pulse signal Wb with an exclusive NOR circuit 863, and has the waveform shown in the part (f) of FIG. 21. The "L" period of this noise eliminating signal Wx substantially includes the changing timings from "L" to "H" and from "H" to "L" of the main PWM pulse signal Wm, and has at least the predetermined time width Tb from each of the changing timings. In addition, the "L" period of the noise eliminating signal Wx substantially includes the changing timings from "L" to "H" and from "H" to "L" of the auxiliary PWM pulse signal Wh, and has at least the predetermined time width Tb from each of the changing timings. This noise eliminating signal Wx is input to the noise eliminating circuit 201 of the detected pulse produce part 42 of the voltage detecting part 30. The noise eliminating signal Wx eliminates a PWM noise occurring in the signals for comparing and detecting the winding terminal voltages depending on the high-frequency switching operation of the power transistors.

By configuring the PWM pulse part of the switching control part 22 as shown in FIG. 20, the low-side power transistors perform ON-OFF high-frequency switching operation in response to the main PWM pulse signal Wm. The high-side power transistors perform ON-OFF high-frequency switching operation in response to the auxiliary PWM pulse signal Wh. While the noise eliminating signal Wx is "L," the voltage detecting part 30 stops the detection of the winding terminal voltages. Therefore, the voltage detecting part 30 stops the detection of the winding terminal voltages during the first stop period including the changing timing from OFF to ON and during the second stop period including the changing timing from ON to OFF of the low-side power transistor. The detection of the detected pulse signal in response to the comparison result of the winding terminal voltages is performed during the remaining period excluding the first stop period and the second stop period. Furthermore, the voltage detecting part 30 stops the detection of the winding terminal voltages during the first stop period including the changing timing from ON to OFF and during the second stop period including the changing timing from OFF to ON of the high-side power transistor. The detection of the detected pulse signal responding directly with the comparison result of the winding terminal voltages is performed during the remaining period excluding the first stop period and the second stop period. This prevents an improper detection and an improper operation caused by a PWM noise owing to the PWM switching operation of the low-side and/or high-side power transistors.

These operations are performed by using the noise eliminating signal Wx. In other words, the noise eliminating signal Wx responding with the main PWM pulse signal used as a switching pulse signal becomes "L" in the first predetermined time including the changing timing from OFF to ON and in the second predetermined time including the changing timing from ON to OFF of the switching pulse signal. The noise eliminating circuit 201 of the voltage detecting part 30 nullifies the output signal of the voltage comparing part 41 during these predetermined time periods. It is needless to say that these configurations and similar changes are included in the present invention.

Embodiment 2

Figure 22:
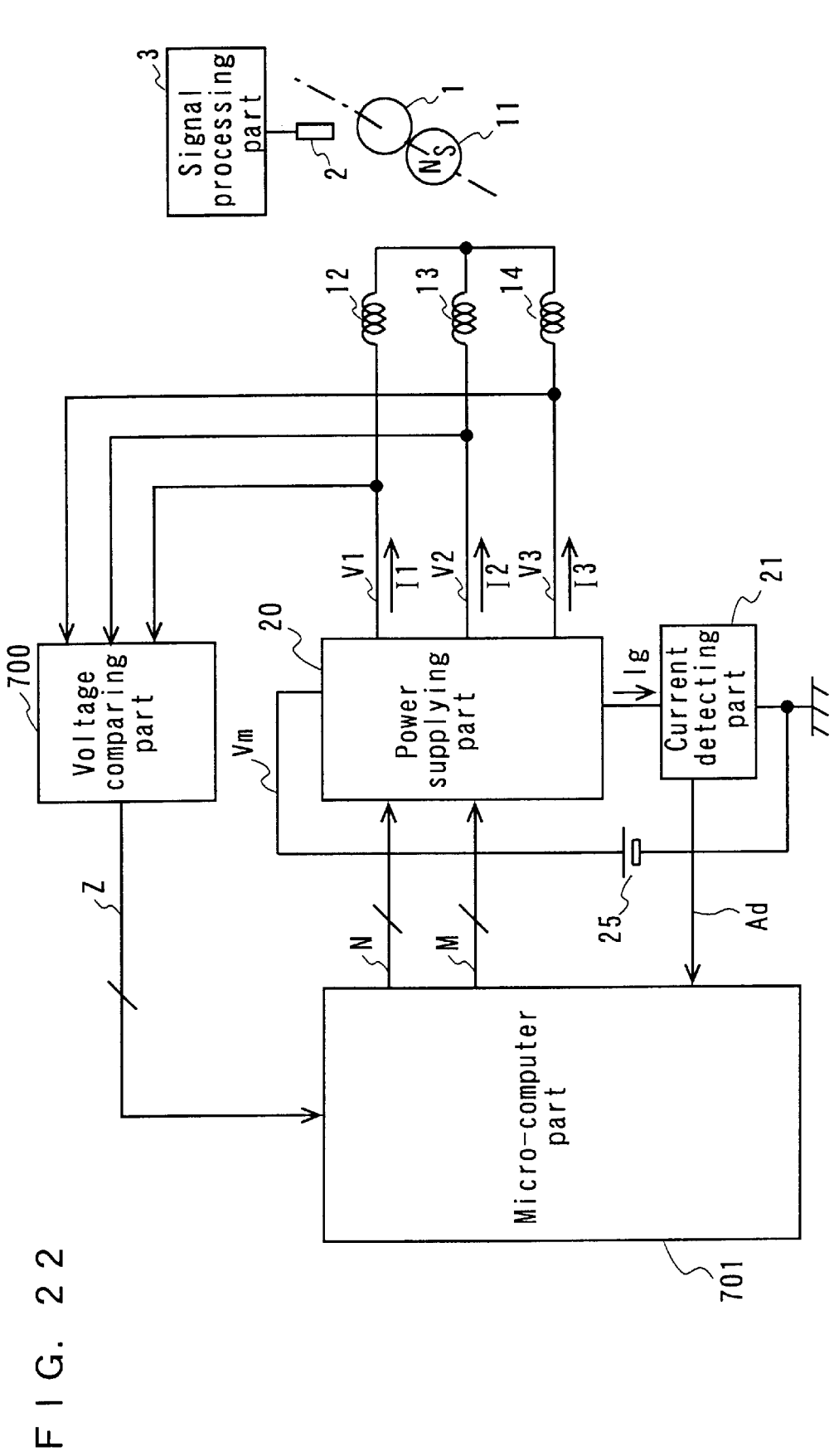
FIG. 22 is a diagram showing the configuration in accordance with embodiment 2 of the present invention.
Figure 23:
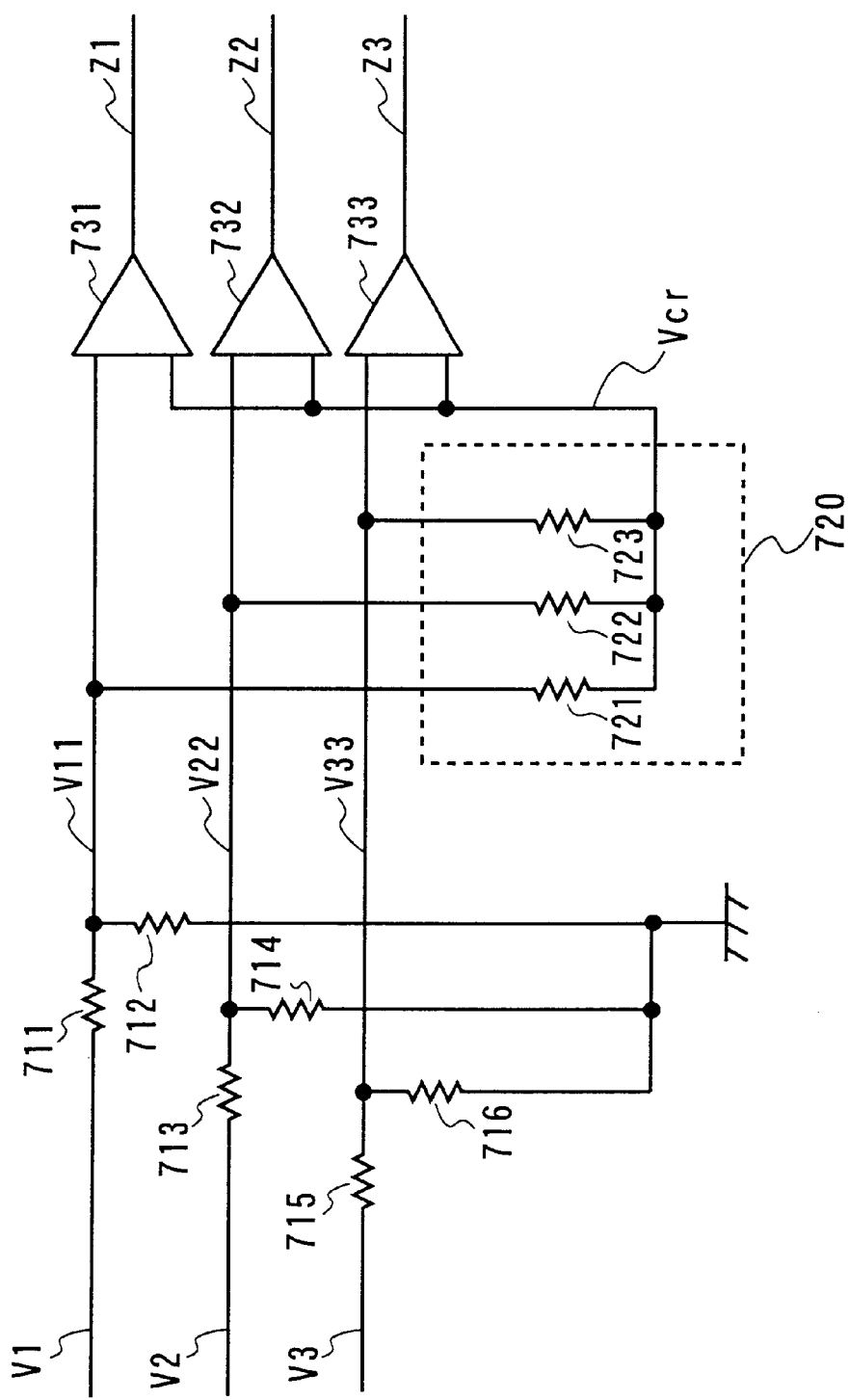
FIG. 23 is a circuit diagram of a voltage comparing part 700 in accordance with the embodiment 2.

FIG. 22 and FIG. 23 show a motor and a disk drive apparatus in accordance with embodiment 2 of the present invention. FIG. 22 shows a comprehensive configuration of the motor and the disk drive apparatus. In the present embodiment, the functions of the voltage detecting part 30, the state shifting part 31, the activation control part 32 and the switching control part 22 in accordance with the above-mentioned embodiment 1 are partially included in the hardware and software of a micro-computer part 701. The parts or the circuits having the same functions and configurations as those of the above-mentioned embodiment 1 are represented by the same numerals, and their explanations are omitted.

The power supplying part 20 changes the states of the activation to the windings 12, 13 and 14 in accordance with the rotation of the disk 1 or the rotor 11. A voltage comparing part 700 detects the terminal voltages of the windings 12, 13 and 14, and outputs compared pulse signals Z1, Z2 and Z3 responding with the terminal voltages. FIG. 23 shows a configuration of the voltage comparing part 700.

The voltage comparing part shown in FIG. 23 divides the winding terminal voltages V1, V2 and V3 by using resistors 711 to 716, thereby producing divided terminal voltages V11, V22 and V33. A composite voltage circuit 720 composes the divided terminal voltages V11, V22 and V33 by using resistors 721, 722 and 723, thereby producing a composite common terminal voltage Vcr. Comparator circuits 731, 732 and 733 compare the divided terminal voltages V11, V22 and V33 with the composite common terminal voltage Vcr respectively, and output the compared pulse signal Z1, Z2 and Z3 responding with the result of the comparison. As a result, the voltage comparing part 700 produces the compared pulse signal Z1, Z2 and Z3 by comparing substantially the terminal voltages of the windings 12, 13 and 14 with the common terminal voltage at the common terminal of the windings.

The micro-computer part 701 shown in FIG. 22 receives the compared pulse signals Z1, Z2 and Z3 of the voltage comparing part 700, and detects the changing timings of the compared pulse signals corresponding to the zero-cross timings of the terminal voltages in response to the states of the activation to the windings while eliminating the influence of PWM noise. On the basis of this detection of the changing timing, the micro-computer part 701 performs timing adjustment operation for predetermined time periods and shifts its internal state. In other words, the micro-computer part 701 shifts the holding state from a first state to a second state after the first adjust time T1 from the detection of the changing timing, and further shifts the holding state from the second state to a third state after the second adjust time T2 from the detection of the changing time. The holding state in the micro-computer 701 is shifted sequentially in the twelve holding states. On the basis of this internal holding state, the micro-computer part 701 determines the active periods of the three-phase low-side activation control signals M1, M2 and M3 and the three-phase high-side activation control signals N1, N2 and N3. In addition, the micro-computer part 701 receives the current detected signal Ad of the current detecting part 21 as a digital current signal converted by an AD converter, and compares the digital current signal with a digital command signal. The micro-computer part 701 produces the main PWM pulse signal responding with the comparison result between the digital current signal and the digital command signal in the softwear, and produces the above-mentioned low-side activation control signals M1, M2 and M3 responding with the main PWM pulse signal. In other words, each of the low-side activation control signals M1, M2 and M3 is coincident with the main PWM pulse signal in each active period. Furthermore, the micro-computer part 701 produces the auxiliary PWM pulse signal responding with or corresponding to the main PWM pulse signal, and produces the above-mentioned high-side activation control signals N1, N2 and N3 responding with the auxiliary PWM pulse signal. In other words, each of the high-side activation control signals N1, N2 and N3 has an ON period without responding the auxiliary PWM pulse signal and another ON period with responding the auxiliary PWM pulse signal. As a result, the OFF-ON PWM operation of the high-side power transistors complementary to the ON-OFF PWM operation of the low-side power transistors is performed. Moreover, the micro-computer part 701 produces the noise eliminating signal responding with or corresponding to the main PWM pulse signal so as to eliminate PWM noises included in the above-mentioned compared pulse signals, thereby avoiding a miss-detection of the changing timings of the terminal voltages. The waveforms of the low-side activation control signals M1, M2 and M3 and the high-side activation control signals N1, N2 and N3 are same as those explained in the embodiment 1. Apart of these operations is not required to be executed only by using the software of the micro-computer part 701, but may be executed by using its hardware.

Many advantages similar to those of the above-mentioned embodiment 1 can also be obtained in the present embodiment by performing operations similar to those of the embodiment 1.

Embodiment 3

Figure 25:
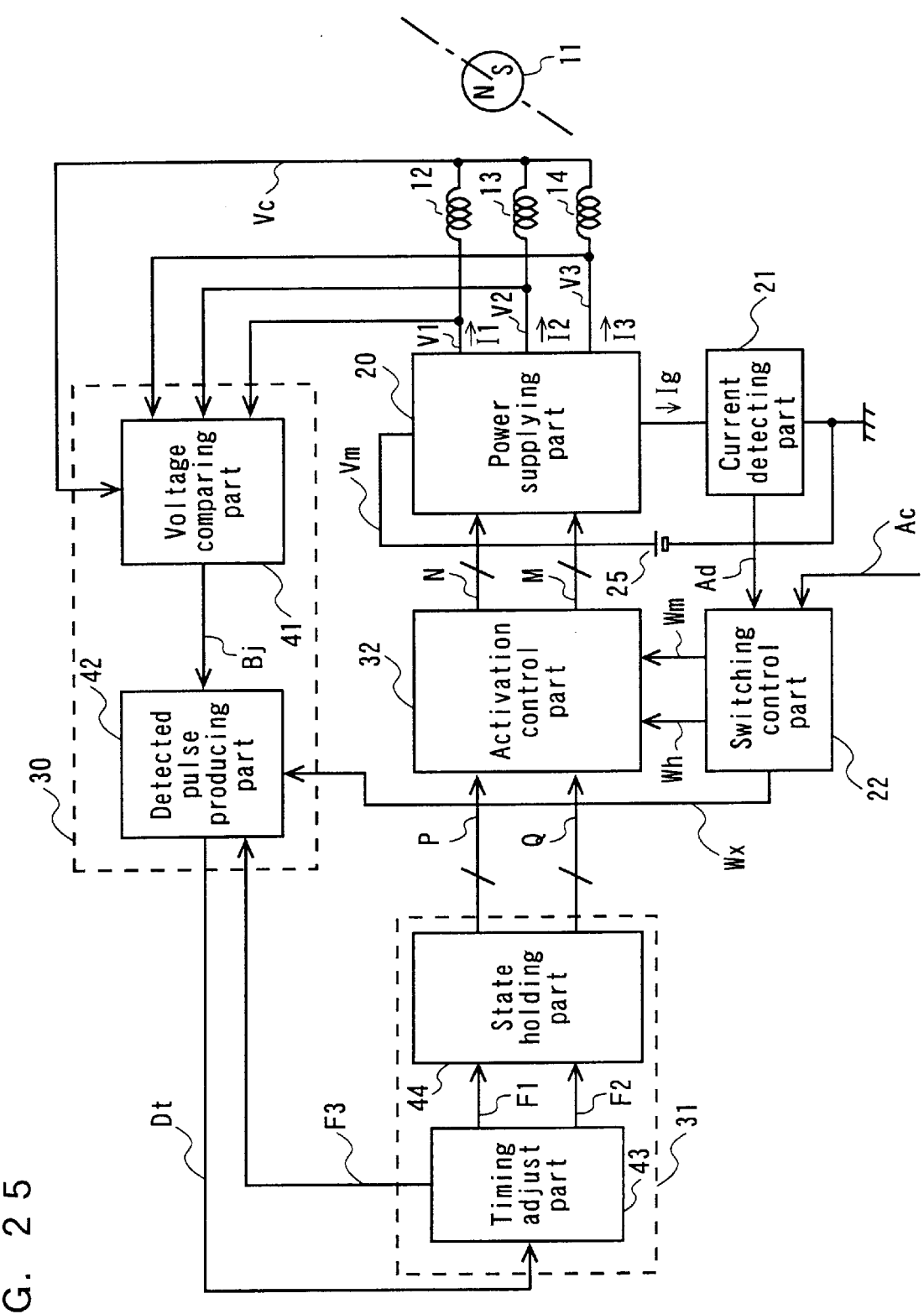
FIG. 25 is a diagram showing the configuration in accordance with embodiment 3 of the present invention.
Figure 26:
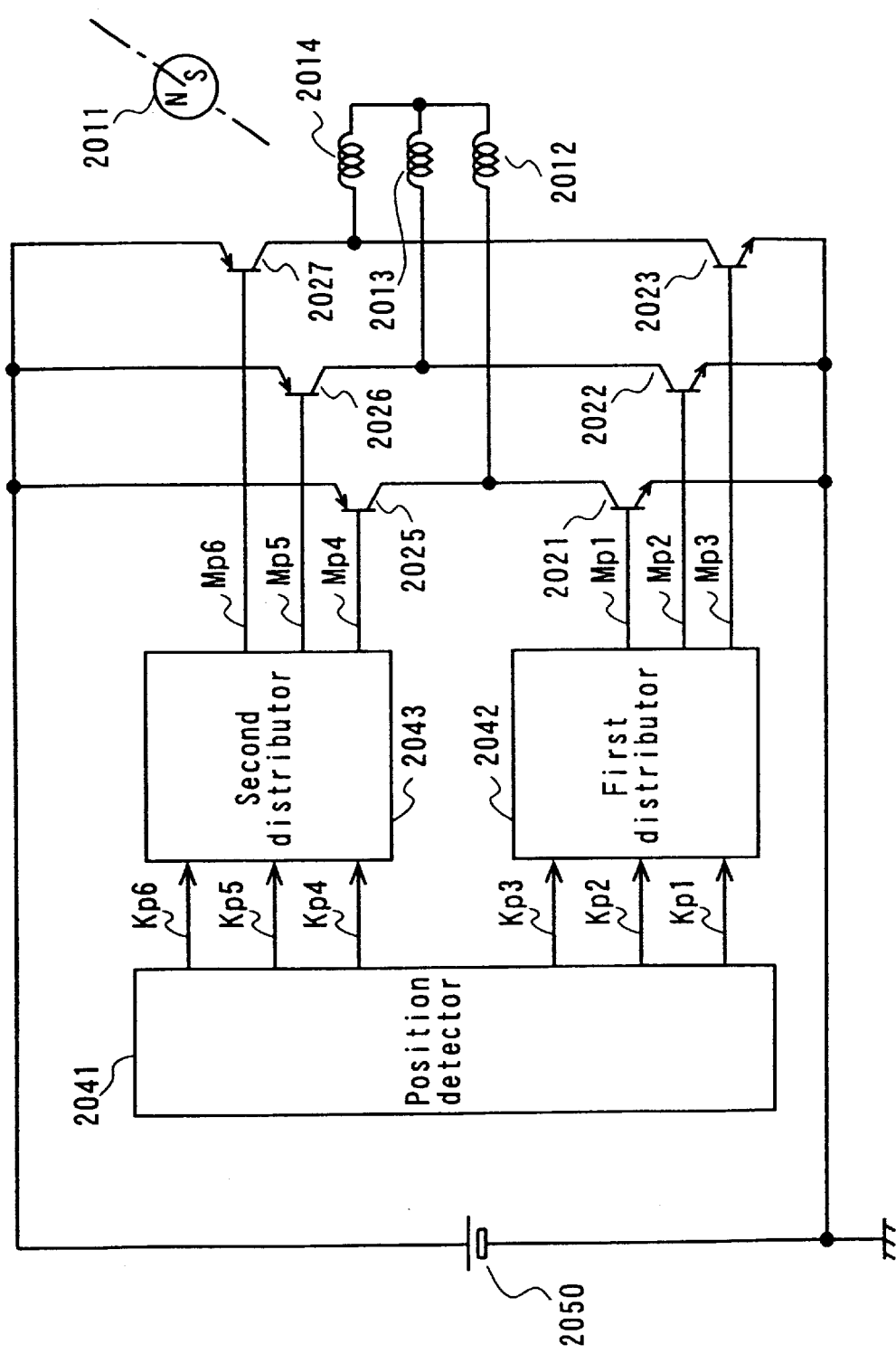
FIG. 26 is a diagram showing the configuration of a motor used for a conventional disk drive apparatus.

FIG. 25 shows a configuration of a motor in accordance with embodiment 3 of the present invention. The rotor 11 is provided with a field part for generating field fluxes from plural magnetic poles. Although a field part formed by a two-pole permanent magnet is herein shown, it is generally possible to form a multi-pole field part with a multi-pole magnet or with many magnetic pole pieces. The three-phase windings 12, 13 and 14 are disposed on the stator, each displaced from the others by substantially an electrical angle of 120 degrees. An electrical angle of 360 degrees corresponds to an angle width of one set of the N and S poles in the field part of the rotor. The one ends of the windings 12, 13 and 14 are common-connected, and the other ends thereof are used as power supply terminals and connected to the output terminals of the power supplying part 20. The three-phase windings 12, 13 and 14 generate three-phase magnetic fluxes by three-phase drive current signals I1, I2 and I3, and also generate a drive force by the interaction between the field part of the rotor 11 and the drive current signals, thereby providing the drive force to the rotor 11.

The power supplying part 20 forms current paths from the voltage supplying part 25 to the three-phase windings 12, 13 and 14 in response to three-phase low-side activation control signals M1, M2 and M3 and three-phase high-side activation control signals N1, N2 and N3 of the activation control part 32, and supplies power to the windings 12, 13 and 14. FIG. 2 shows the configuration of the power supplying part 20, which is explained before.

The voltage detecting part 30 comprises the voltage comparing part 41 and the detected pulse producing part 42. The three-phase terminal voltages V1, V2 and V3 at the power supplying terminals of the three-phase windings 12, 13 and 14 and the common terminal voltage Vc at the common terminal of the three-phase windings are input to the voltage comparing part 41. The voltage comparing part 41 substantially compares the three-phase terminal voltages with the common terminal voltage selectively and directly, and outputs a selective voltage compared signal Bj responding with the comparison result. The detected pulse producing part 42 outputs a detected pulse signal Dt by eliminating a high-frequency switching noise included in the selective voltage compared signal Bj. FIG. 3 or 4 shows the configuration of the voltage comparing part 41, which is explained before. FIG. 5 shows the configuration of the detected pulse producing part 42, which is explained before.

The state shifting part 31 comprises the timing adjust part 43 and the state holding part 44. The timing adjust part 43 outputs a first timing adjust signal F1 delayed by a first adjust time T1, a second timing adjust signal F2 delayed by a second adjust time T2 and a third timing adjust signal F3 delayed by a third adjust time T3 from every arrival of the rising edges of the detected pulse signal Dt. The state holding part 44 changes its holding state in response to the first timing adjust signal F1 and the second timing adjust signal F2, and outputs first state signals P1 to P6 and second state signals Q1 to Q6 responding with the holding state. FIG. 6 shows the configuration of the timing adjust part 43, which is explained before. FIG. 7 shows the configuration of the state holding part 44, which is explained before.

The activation control part 32 outputs the three-phase low-side activation control signals M1, M2 and M3 and the three-phase high-side activation control signals N1, N2 and N3 responding with the holding state (the first state signals P1 to P6 and the second state signals Q1 to Q6) of the state shifting part 31. Therefore, the activation periods of the power transistors are determined by the first state signals and the second state signals. Furthermore, the low-side activation control signals M1, M2 and M3 and the high-side activation control signals N1, N2 and N3 of the activation control part respond with the main PWM pulse signal Wm and the auxiliary PWM pulse signal Wh of the switching control part 22. FIG. 8 shows the configuration of the activation control part 32, which is explained before.

The switching control circuit 22 compares the current detected signal Ad of the current detecting part 21 with the command signal Ac, and outputs the main PWM pulse signal Wm, the auxiliary PWM pulse signal Wh and the noise eliminating signal Wx responding with the comparison result. The main PWM pulse signal Wm and the auxiliary PWM pulse signal Wh of the switching control part 22 are input to the activation control part 32. The noise eliminating signal Wx of the switching control part 22 is input to the detected pulse producing part 42 of the voltage detecting part 30. The command signal Ac is a voltage signal produced by a speed detecting mechanism for example. The speed detecting mechanism detects the rotational speed of the rotor 11 with the detected pulse signal Dt of the voltage detecting part 30, and produces the command signal Ac responding with the difference between the rotational speed and the target speed for example. FIG. 9 shows the configuration of the switching control part 22, which is explained before.

The operations of the embodiment 3 are similar to those of the above-mentioned embodiment 1, and their explanations are omitted. In addition, many advantages similar to those of the above-mentioned embodiment 1 can also be obtained by using the motor of the embodiment 3.

The configurations of the above-mentioned embodiments can be modified variously. For example, each of the three-phase windings may be formed by connecting plural winding portions in series or parallel. The connection of the three-phase windings is not limited to star connection, but delta connection may be used. Furthermore, the number of the phases of the windings is not limited to three. Generally, it is possible to realize a configuration having plural-phase windings. In addition, the number of the magnetic poles in the field part of the rotor is not limited to two, but multi-poles may be used.

In addition, in the above-mentioned embodiments, FET power transistors are used as the power transistors of the power supplying part to make high-frequency switching operation easy. With this configuration, power loses and heat generation of the power transistors are reduced, whereby the transistors can easily be formed into a one-chip integrated circuit. However, the present invention is not limited to such a case. For example, bipolar transistors or IGBT transistors can also be used as the power transistors. Furthermore, the power transistors of the power supplying part are subjected to ON-OFF high-frequency switching operation. However, the operation is not limited to full ON-OFF PWM operation, but ON-OFF PWM operation including half ON operation may be performed. For example, according to the U.S. Pat. No. 5,982,118, the drive voltages supplied to the windings are subjected to PWM operation in accordance with the output signals of three position detecting elements. This patent discloses a motor wherein FET power transistors are subjected to high-frequency switching operation between the ON state (full-ON or half-ON state) and the OFF state, in order to smoothly alternate the drive currents to the windings while reducing the power loses of the power transistors.

Furthermore, although only the low-side power transistors are subjected to high-frequency switching operation in the above-mentioned embodiments, the present invention is not limited to such a case. The high-side power transistors may only be subjected to high-frequency switching operation, or the low-side power transistors and the high-side power transistors may be subjected to high-frequency switching operation alternately or simultaneously. Moreover, in the present invention, the three low-side power transistors or the three high-side power transistors are subjected to high-frequency switching operation simultaneously in response to a single pulse signal so that the switching operation can be performed with a simple configuration. However, the configuration of the present invention is not limited to such a case, but can be modified variously. Generally speaking, it is possible to use a configuration wherein at least one power transistor is subjected to high-frequency switching operation in response to the switching pulse signal.

Furthermore, although the current detecting part simply detects the supply current of the negative parts of the drive current signals to the windings from the voltage supplying part with a resistor, the present invention is not limited to such a case. The current detecting part may detect the supply current of the positive parts of the drive current signals to the windings from the voltage supplying part. Moreover, the current detecting part may detect the sum of the conducting currents of the low-side power transistors or the high-side power transistors.

In addition, it is needless to say that the configuration can be modified variously without departing from the purpose of the present invention, and that such modifications can be included in the present invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A motor comprising:

a rotor which has a field part generating field fluxes;

Q-phase windings (Q is an integer of 3 or more);

voltage supplying means which includes two output terminals for supplying a DC voltage;

power supplying means having Q first power transistors and Q second power transistors for supplying a power to said Q-phase windings, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal;

state shifting means for shifting a holding state from one state to at least one other state in sequence responding with the detected pulse signal of said voltage detecting means;

activation control means for controlling active periods of said Q first power transistors and said Q second power transistors responding with said holding state; and switching operation means for causing at least one of said Q first power transistors and said Q second power transistors to perform high-frequency switching corresponding to a command signal;

and that said activation control means produces Q-phase first activation control signals and Q-phase second activation control signals responding with said holding state of said state shifting means for controlling said active periods of said Q first power transistors and said Q second power transistors, each of said active periods being an electrical angle larger than 360/Q degrees, said switching operation means produces a switching pulse signal responding with said command signal, and makes high-frequency switching operation of at least one power transistor among said Q first power transistors and said Q second power transistors responding with said switching pulse signal, and said voltage detecting means stops detecting of said detected pulse signal during at least one of a first stop period including a changing timing from OFF to ON of said at least one power transistor and a second stop period including another changing timing from ON to OFF of said at least one power transistor, and executes detecting of said detected pulse signal during at least ON period of said at least one power transistor excluding said at least one of said first stop period and said second stop period, thereby producing said detected pulse signal responding with terminal voltages of said Q-phase windings.

2. The motor in accordance with claim 1, wherein said voltage detecting means stops detecting of said detected pulse signal during both of said first stop period and said second stop period, and executes detecting of said detected pulse signal during a rest period excluding said both of said first stop period and said second stop period, thereby producing said detected pulse signal responding with terminal voltages of said Q-phase windings.

3. The motor in accordance with claim 1, wherein said voltage detecting means includes:

voltage comparing means for producing an output signal responding with comparison result of terminal voltages of said Q-phase windings, and noise eliminating means for gating the output signal of said voltage comparing means with a noise eliminating signal responding or corresponding with said switching pulse signal, so as not to pass the output signal of said voltage comparing means during at least one of a first period including a changing timing from OFF to ON of said switching pulse signal and a second period including another changing timing from ON to OFF of said switching pulse signal.

4. The motor in accordance with claim 3, wherein said voltage detecting means further includes:

pulse producing means having a flip-flop circuit for changing a state of said flip-flop circuit with an rising or falling edge of an output signal of said noise eliminating means and producing said detected pulse signal responding with the state of said flip-flop circuit.

5. The motor in accordance with claim 1, wherein said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time.

6. The motor in accordance with the claim 5, wherein said state shifting means produces said first adjust time and said second adjust time substantially proportional to an interval of said detected pulse signal.

7. The motor in accordance with claim 5, wherein said voltage detecting means stops detecting of said detected pulse signal from a pulse timing of said detected pulse signal to a third adjust time, said third adjust time being larger than said second adjust time and substantially proportional to an interval of said detected pulse signal.

8. The motor in accordance with claim 1, wherein said switching operation means includes:

current detecting means for producing a current detected signal responding with or corresponding to a current from said voltage supplying means to said Q-phase windings, and switching control means for comparing an output signal of said current detecting means with said command signal and producing said switching pulse signal responding with the comparison result.

9. The motor in accordance with claim 1, wherein said switching operation means causes at least one first power transistor of said Q first power transistors to perform an ON-OFF high-frequency switching operation, and causes at least one second power transistor of said Q second power transistors in the same phase to perform an OFF-ON high-frequency switching operation opposite to the ON-OFF high-frequency switching operation of said at least one first power transistor.

10. The motor in accordance with claim 1, further comprising commanding means for producing said command signal responding with an output pulse signal of said voltage detecting means.

11. A motor comprising:

a rotor which has a field part generating field fluxes;

Q-phase windings (Q is an integer of 3 or more);

voltage supplying means which includes two output terminals for supplying a DC voltage;

power supplying means having Q first power transistors and Q second power transistors for supplying a power to said Q-phase windings, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal;

state shifting means for shifting a holding state from one state to at least one other state in sequence responding with the detected pulse signal of said voltage detecting means;

activation control means for controlling active periods of said Q first power transistors and said Q second power transistors responding with said holding state; and switching operation means for causing at least one of said Q first power transistors and said Q second power transistors to perform high-frequency switching corresponding to a command signal;

and that said activation control means produces Q-phase first activation control signals and Q-phase second activation control signals responding with said holding state of said state shifting means for controlling said active periods of said Q first power transistors and said Q second power transistors, each of said active periods being an electrical angle larger than 360/Q degrees, said switching operation means produces a switching pulse signal responding with said command signal, and makes high-frequency switching operation of at least one power transistor among said Q first power transistors and said Q second power transistors responding with said switching pulse signal, and said voltage detecting means includes:

voltage comparing means for producing an output signal responding with comparison result of terminal voltages of said Q-phase windings, and noise eliminating means for gating said output signal of said voltage comparing means with a noise eliminating signal responding or corresponding with said switching pulse signal, so as not to pass the output signal of said voltage comparing means during at least one of a first period including a changing timing from OFF to ON of said switching pulse signal and a second period including another changing timing from ON to OFF of said switching pulse signal.

12. The motor in accordance with claim 11, wherein said voltage detecting means further includes:

pulse producing means having a flip-flop circuit for changing a state of said flip-flop circuit with an rising or falling edge of an output signal of said noise eliminating means and producing said detected pulse signal responding with the state of said flip-flop circuit.

13. The motor in accordance with claim 11, wherein said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time, and said first adjust time and said second adjust time are substantially proportional to an interval of said detected pulse signal.

14. The motor in accordance with claim 11, wherein said voltage detecting means stops detecting of said detected pulse signal from a pulse timing of said detected pulse signal to a delayed timing.

15. The motor in accordance with claim 11, wherein said switching operation means includes:

current detecting means for producing a current detected signal responding with or corresponding to a current from said voltage supplying means to said Q-phase windings, and switching control means for comparing an output signal of said current detecting means with said command signal and producing said switching pulse signal responding with the comparison result.

16. The motor in accordance with claim 11, further comprising commanding means for producing said command signal responding with an output pulse signal of said voltage detecting means.

17. A motor comprising:

a rotor which has a field part generating field fluxes;

Q-phase windings (Q is an integer of 3 or more);

voltage supplying means which includes two output terminals for supplying a DC voltage;

power supplying means having Q first power transistors and Q second power transistors for supplying a power to said Q-phase windings, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal;

state shifting means for shifting a holding state from one state to at least one other state in sequence responding with the detected pulse signal of said voltage detecting means;

activation control means for controlling active periods of said Q first power transistors and said Q second power transistors responding with said holding state; and switching operation means for causing at least one of said Q first power transistors and said Q second power transistors to perform high-frequency switching corresponding to a command signal;

and that said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time, said activation control means produces Q-phase first activation control signals and Q-phase second activation control signals responding with said holding state of said state shifting means for controlling said active periods of said Q first power transistors and said Q second power transistors, each of said active periods being an electrical angle larger than 360/Q degrees, and said switching operation means includes:

current detecting means for producing a current detected signal responding with or corresponding to a current from said voltage supplying means to said Q-phase windings, and switching control means for comparing an output signal of said current detecting means with said command signal and producing a switching pulse signal responding with the comparison result, thereby making high-frequency switching operation of at least one power transistor among said Q first power transistors and said Q second power transistors responding with said switching pulse signal.

18. The motor in accordance with claim 17, wherein said state shifting means produces said first adjust time and said second adjust time substantially proportional to an interval of said detected pulse signal.

19. The motor in accordance with claim 17, wherein said voltage detecting means stops detecting of said detected pulse signal during at least one of a first stop period including a changing timing from OFF to ON of said at least one power transistor and a second stop period including another changing timing from ON to OFF of said at least one power transistor, and executes detecting of said detected pulse signal during at least ON period of said at least one power transistor excluding said at least one of said first stop period and said second stop period, thereby producing said detected pulse signal responding with terminal voltages of said Q-phase windings.

20. A disk drive apparatus comprising:

a head for at least reproducing a signal from a disk or recording a signal on a disk;

processing means for at least processing an output signal from said head and outputting a reproducing information signal, or processing a recording information signal and outputting a signal into said head;

a rotor which has a field part generating field fluxes, and directly drives said disk;

Q-phase windings (Q is an integer of 3 or more);

voltage supplying means which include two output terminals for supplying a DC voltage;

power supplying means having Q first power transistors and Q second power transistors for supplying a power to said Q-phase windings, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal;

state shifting means for shifting a holding state from one state to at least one other state in sequence responding with the detected pulse signal of said voltage detecting means;

activation control means for controlling active periods of said Q first power transistors and said Q second power transistors responding with said holding state; and switching operation means for causing at least one of said Q first power transistors and said Q second power transistors to perform high-frequency switching corresponding to a command signal;

and that said activation control means produces Q-phase first activation control signals and Q-phase second activation control signals responding with said holding state of said state shifting means for controlling said active periods of said Q first power transistors and said Q second power transistors, each of said active periods being an electrical angle larger than 360/Q degrees, said switching operation means produces a switching pulse signal responding with said command signal, and makes high-frequency switching operation of at least one power transistor among said Q first power transistors and said Q second power transistors responding with said switching pulse signal, and said voltage detecting means stops detecting of said detected pulse signal during at least one of a first stop period including a changing timing from OFF to ON of said at least one power transistor and a second stop period including another changing timing from ON to OFF of said at least one power transistor, and executes detecting of said detected pulse signal during at least ON period of said at least one power transistor excluding said at least one of said first stop period and said second stop period, thereby producing said detected pulse signal responding with terminal voltages of said Q-phase windings.

21. The disk drive apparatus in accordance with claim 20, wherein said voltage detecting means stops detecting of said detected pulse signal during both of said first stop period and said second stop period, and executes detecting of said detected pulse signal during a rest period excluding said both of said first stop period and said second stop period, thereby producing said detected pulse signal responding with terminal voltages of said Q-phase windings.

22. The disk drive apparatus in accordance with claim 20, wherein said voltage detecting means includes:

voltage comparing means for producing an output signal responding with comparison result of terminal voltages of said Q-phase windings, and noise eliminating means for gating the output signal of said voltage comparing means with a noise eliminating signal responding or corresponding with said switching pulse signal, so as not to pass the output signal of said voltage comparing means during at least one of a first period including a changing timing from OFF to ON of said switching pulse signal and a second period including another changing timing from ON to OFF of said switching pulse signal.

23. The disk drive apparatus in accordance with claim 22, wherein said voltage detecting means further includes:

pulse producing means having a flip-flop circuit for changing a state of said flip-flop circuit with an rising or falling edge of an output signal of said noise eliminating means and producing said detected pulse signal responding with the state of said flip-flop circuit.

24. The disk drive apparatus in accordance with claim 20, wherein
said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time.

25. The disk drive apparatus in accordance with the claim 24, wherein
said state shifting means produces said first adjust time and said second adjust time substantially proportional to an interval of said detected pulse signal.

26. The disk drive apparatus in accordance with claim 24, wherein
said voltage detecting means stops detecting of said detected pulse signal from a pulse timing of said detected pulse signal to a third adjust time, said third adjust time being larger than said second adjust time and substantially proportional to an interval of said detected pulse signal.

27. The disk drive apparatus in accordance with claim 20, wherein
said switching operation means includes:
current detecting means for producing a current detected signal responding with or corresponding to a current from said voltage supplying means to said Q-phase windings, and
switching control means for comparing an output signal of said current detecting means with said command signal and producing said switching pulse signal responding with the comparison result.

28. The disk drive apparatus in accordance with claim 20, wherein
said switching operation means causes at least one first power transistor of said Q first power transistors to perform an ON-OFF high-frequency switching operation, and causes at least one second power transistor of said Q second power transistors in the same phase to perform an OFF-ON high-frequency switching operation opposite to the ON-OFF high-frequency switching operation of said at least one first power transistor.

29. The disk drive apparatus in accordance with claim 20, further comprising
commanding means for producing said command signal responding with an output pulse signal of said voltage detecting means.

30. A disk drive apparatus comprising:
a head for at least reproducing a signal from a disk or recording a signal on a disk;
processing means for at least processing an output signal from said head and outputting a reproducing information signal, or processing a recording information signal and outputting a signal into said head;
a rotor which has a field part generating field fluxes, and directly drives said disk;
Q-phase windings (Q is an integer of 3 or more);
voltage supplying means which includes two output terminals for supplying a DC voltage;
power supplying means having Q first power transistors and Q second power transistors for supplying a power to said Q-phase windings, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
voltage detecting means for producing a detected pulse signal;
state shifting means for shifting a holding state from one state to at least one other state in sequence responding with the detected pulse signal of said voltage detecting means;
activation control means for controlling active periods of said Q first power transistors and said Q second power transistors responding with said holding state; and
switching operation means for causing at least one of said Q first power transistors and said Q second power transistors to perform high-frequency switching corresponding to a command signal;
and that
said activation control means produces Q-phase first activation control signals and Q-phase second activation control signals responding with said holding state of said state shifting means for controlling said active periods of said Q first power transistors and said Q second power transistors, each of said active periods being an electrical angle larger than 360/Q degrees,
said switching operation means produces a switching pulse signal responding with said command signal, and makes high-frequency switching operation of at least one power transistor among said Q first power transistors and said Q second power transistors responding with said switching pulse signal, and
said voltage detecting means includes:
voltage comparing means for producing an output signal responding with comparison result of terminal voltages of said Q-phase windings, and
noise eliminating means for gating said output signal of said voltage comparing means with a noise eliminating signal responding or corresponding with said switching pulse signal, so as not to pass the output signal of said voltage comparing means during at least one of a first period including a changing timing from OFF to ON of said switching pulse signal and a second period including another changing timing from ON to OFF of said switching pulse signal.

31. The disk drive apparatus in accordance with claim 30, wherein
said voltage detecting means further includes:
pulse producing means having a flip-flop circuit for changing a state of said flip-flop circuit with an rising or falling edge of an output signal of said noise eliminating means and producing said detected pulse signal responding with the state of said flip-flop circuit.

32. The disk drive apparatus in accordance with claim 30, wherein
said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time, and
said first adjust time and said second adjust time are proportional to an interval of said detected pulse signal.

33. The disk drive apparatus in accordance with claim 30, wherein
said voltage detecting means stops detecting of said detected pulse signal from a pulse timing of said detected pulse signal to a delayed timing.

34. The disk drive apparatus in accordance with claim 30, wherein
said switching operation means includes:
current detecting means for producing a current detected signal responding with or corresponding to a current from said voltage supplying means to said Q-phase windings, and
switching control means for comparing an output signal of said current detecting means with said command signal and producing said switching pulse signal responding with the comparison result.

35. The disk drive apparatus in accordance with claim 30, further comprising
commanding means for producing said command signal responding with an output pulse signal of said voltage detecting means.

36. A disk drive apparatus comprising:
a head for at least reproducing a signal from a disk or recording a signal on a disk;
processing means for at least processing an output signal from said head and outputting a reproducing information signal, or processing a recording information signal and outputting a signal into said head;
a rotor, which has a field part generating field fluxes, and directly drives said disk;
Q-phase windings (Q is an integer of 3 or more);
voltage supplying means, which includes two output terminals for supplying a DC voltage;
power supplying means having Q first power transistors and Q second power transistors for supplying a power to said Q-phase windings, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
voltage detecting means for producing a detected pulse signal;
state shifting means for shifting a holding state from one state to at least one other state in sequence responding with the detected pulse signal of said voltage detecting means;
activation control means for controlling active periods of said Q first power transistors and said Q second power transistors responding with said holding state; and
switching operation means for causing at least one of said Q first power transistors and said Q second power transistors to perform high-frequency switching corresponding to a command signal;
and that
said state shifting means shifts said holding state from a first state to a second state after a first adjust time from detection of said detected pulse signal, and further shifts said holding state from said second state to a third state after a second adjust time from detection of said detected pulse signal, said second adjust time being larger than said first adjust time,
said activation control means produces Q-phase first activation control signals and Q-phase second activation control signals responding with said holding state of said state shifting means for controlling said active periods of said Q first power transistors and said Q second power transistors, each of said active periods being an electrical angle larger than 360/Q degrees, and
said switching operation means includes:
current detecting means for producing a current detected signal responding with or corresponding to a current from said voltage supplying means to said Q-phase windings, and
switching control means for comparing an output signal of said current detecting means with said command signal and producing a switching pulse signal responding with the comparison result, thereby making high-frequency switching operation of at least one power transistor among said Q first power transistors and said Q second power transistors responding with said switching pulse signal.

37. The disk drive apparatus in accordance with claim 36, wherein
said state shifting means produces said first adjust time and said second adjust time substantially proportional to an interval of said detected pulse signal.

38. The disk drive apparatus in accordance with claim 36, wherein
said voltage detecting means stops detecting of said detected pulse signal during at least one of a first stop period including a changing timing from OFF to ON of said at least one power transistor and a second stop period including another changing timing from ON to OFF of said at least one power transistor, and executes detecting of said detected pulse signal during at least ON period of said at least one power transistor excluding said at least one of said first stop period and said second stop period, thereby producing said detected pulse signal responding with terminal voltages of said Q-phase windings.

* * * * *